(12) United States Patent
Khan et al.

(10) Patent No.: US 12,111,887 B2
(45) Date of Patent: *Oct. 8, 2024

(54) DIGITAL PEN WRITER VERIFICATION DEVICE

(71) Applicant: Prince Mohammad Bin Fahd University, Dhahran (SA)

(72) Inventors: Majid Ali Khan, Dhahran (SA); Nazeeruddin Mohammad, Dhahran (SA); Ghassen Ben Brahim, Dhahran (SA); Abul Bashar, Dhahran (SA); Ghazanfar Latif, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,050

(22) Filed: Mar. 11, 2024

(65) Prior Publication Data

US 2024/0248957 A1 Jul. 25, 2024

Related U.S. Application Data

(63) Continuation of application No. 18/441,179, filed on Feb. 14, 2024, now Pat. No. 12,019,708, which is a (Continued)

(51) Int. Cl.
*G06K 9/62* (2022.01)
*G06F 18/214* (2023.01)
(Continued)

(52) U.S. Cl.
CPC ........... *G06F 18/214* (2023.01); *G06F 18/28* (2023.01); *G06V 30/293* (2022.01)

(58) Field of Classification Search
CPC .... G06V 30/1423; G06V 30/293; G07C 9/24; G07C 9/247; G06K 9/6256; G06K 9/6255
See application file for complete search history.

(56) References Cited

U.S. PATENT DOCUMENTS

2016/0328620 A1 11/2016 Elarian
2022/0036128 A1 2/2022 Levanony et al.

FOREIGN PATENT DOCUMENTS

CN 110033052 A 7/2019
WO 2007/075669 A1 7/2007
WO 2019/055849 A1 3/2019

OTHER PUBLICATIONS

Maaz, Using Deep Learning for Arabic Writer Identification, IJCA 2020 (Year: 2020).*

(Continued)

*Primary Examiner* — Mark Roz
(74) *Attorney, Agent, or Firm* — Oblon, McClelland, Maier & Neustadt, L.L.P.

(57) ABSTRACT

A device, method, and non-transitory computer readable medium are described. The method includes receiving a dataset including hand written Arabic words and hand written Arabic alphabets from one or more users. The method further includes removing whitespace around alphabets in the hand written Arabic words and the hand written Arabic alphabets in the dataset. The method further includes splitting the dataset into a training set, a validation set, and a test set. The method further includes classifying one or more user datasets from the training set, the validation set, and the test set. The method further includes identifying the target user from the one or more user datasets. The identification of the target user includes a verification accuracy of the hand written Arabic words being larger than a verification accuracy threshold value.

6 Claims, 15 Drawing Sheets

Related U.S. Application Data continuation of application No. 17/494,429, filed on Oct. 5, 2021, now Pat. No. 11,914,673.

(51) Int. Cl.
*G06F 18/28* (2023.01)
*G06V 30/28* (2022.01)

(56) References Cited

OTHER PUBLICATIONS

Andreas Schlapbach et al., "A writer identification and verification system using HMM based recognizers", Pattern Anal Applic (2007) Oct. 6, 2006.
Bulacu "Text-Independent Writer Identification and Verification on Offline Arabic Handwriting" IEEE 2007 (Year: 2007).
What is the Difference Between Test and Validation Datasets?, Machine Learning Process, Jul. 2017 (Year: 2017).
Hussein (Alexu-Word: A New Dataset for Isolated-Word Closed-Vocabulary Offline Arabic Handwriting Recognition, arXiv 2014) (Year: 2014).

\* cited by examiner

Table 2: Isolated vs. Extracted Alphabet Variations
| User | User001 | | | | User012 | | | |
|---|---|---|---|---|---|---|---|---|
| Isolated Alphabets |  |  |  |  |  |  |  |  |
| Extracted Alphabets |  |  |  |  |  |  |  |  |
FIG. 11
Table 3: Samples of user written isolated alphabets
FIG. 12

Table 6. Alphabet kaf_regular as written by twenty users
|  |  |  |  |  |  |  |
|---|---|---|---|---|---|---|
| user001 | user002 | user003 | user004 | user005 | user006 | user007 |
|  |  |  |  |  |  |  |
| user008 | user009 | user010 | user011 | user012 | user013 | user014 |
|  |  |  |  |  |  | |
| user015 | user016 | user017 | user018 | user019 | user020 | |
FIG. 13

| Group | Alphabet | Alphabet Variations | | | | No. of different forms |
|---|---|---|---|---|---|---|
| | | Regular | Begin | Middle | End | |
| 1 | Alif | ا | ا | ـا | ـا | 2 |
| 2 | Beh | ب | بـ | ـبـ | ـب | 4 |
| | Teh | ت , ة | تـ | ـتـ | ـت , ـة | 6 |
| | Theh | ث | ثـ | ـثـ | ـث | 4 |
| 3 | Jeem | ج | جـ | ـجـ | ـج | 4 |
| | Haa | ح | حـ | ـحـ | ـح | 4 |
| | Khah | خ | خـ | ـخـ | ـخ | 4 |
| 4 | Dal | د | د | ـد | ـد | 2 |
| | Thal | ذ | ذ | ـذ | ـذ | 2 |
| 5 | Raa | ر | ر | ـر | ـر | 2 |
| | Zay | ز | ز | ـز | ـز | 2 |
| 6 | Seen | س | سـ | ـسـ | ـس | 4 |
| | Sheen | ش | شـ | ـشـ | ـش | 4 |
| 7 | Sad | ص | صـ | ـصـ | ـص | 4 |
| | Dad | ض | ضـ | ـضـ | ـض | 4 |
| 8 | Tah | ط | ط | ـطـ | ـط | 2 |
| | Thah | ظ | ظ | ـظـ | ـظ | 2 |
| 9 | Ain | ع | عـ | ـعـ | ـع | 4 |
| | Ghain | غ | غـ | ـغـ | ـغ | 4 |
| 10 | Feh | ف | فـ | ـفـ | ـف | 4 |
| 11 | Qaf | ق | قـ | ـقـ | ـق | 4 |
| 12 | Kaf | ك , ك | كـ | ـكـ | ـك , ـك | 6 |
| 13 | Lam | ل | لـ | ـلـ | ـل | 4 |
| 14 | Meem | م | مـ | ـمـ | ـم | 4 |
| 15 | Noon | ن | نـ | ـنـ | ـن | 4 |
| 16 | Heh | هـ , ة | هـ | ـهـ | ـه | 5 |
| 17 | Waw | و | و | ـو | ـو | 2 |
| 18 | Yaa | ي | يـ | ـيـ | ـي | 4 |
| 19 | Alif hamza | أ | أ | ـأ | ـأ | 2 |

FIG. 14

| userid | فسبكفيكهم | الأبجدية | المستضعفين | صخر | اذن | محرات | شطيره | قشطة | غليظ | غزال | $Y_{wm\_iad}$ |
|---|---|---|---|---|---|---|---|---|---|---|---|
| userid001 | 0.67 | 1 | 0.7 | 1 | 1 | 1 | 1 | 1 | 1 | 1 | 1 |
| userid002 | 1 | 1 | 1 | 1 | 1 | 1 | 1 | 1 | 1 | 1 | 1 |
| userid003 | 1 | 1 | 1 | 1 | 1 | 1 | 1 | 1 | 1 | 1 | 1 |
| userid004 | 1 | 1 | 0.9 | 1 | 1 | 1 | 1 | 1 | 1 | 1 | 1 |
| userid005 | 0.22 | 0.57 | 0.2 | 0 | 0.67 | 0.4 | 0.6 | 1 | 0.75 | 1 | 0.6 |
| userid006 | 0.89 | 1 | 0.8 | 0 | 1 | 0.8 | 0.8 | 1 | 1 | 0.75 | 0.9 |
| userid007 | 1 | 0.86 | 0.9 | 1 | 1 | 1 | 1 | 1 | 1 | 0.75 | 1 |
| userid008 | 1 | 1 | 0.9 | 1 | 0.33 | 1 | 1 | 1 | 1 | 0.75 | 0.9 |
| userid009 | 0.44 | 0.57 | 0.5 | 0.33 | 0.67 | 0.2 | 0.6 | 0.5 | 0.25 | 0 | 0.5 |
| userid010 | 0.56 | 0.43 | 0.5 | 0.67 | 0.33 | 0.4 | 0.6 | 1 | 0.5 | 0.25 | 0.6 |
| userid011 | 0.67 | 0.43 | 0.3 | 0.67 | 0 | 0.2 | 0.4 | 0.25 | 1 | 0.75 | 0.4 |
| userid012 | 0.67 | 0.57 | 0.8 | 0.67 | 0.67 | 0.6 | 0.8 | 0.75 | 1 | 0.75 | 1 |
| userid013 | 0.44 | 0.71 | 0.3 | 0.67 | 0.67 | 0.4 | 0.4 | 0.75 | 0.75 | 0.5 | 0.6 |
| userid014 | 0.56 | 0.86 | 0.7 | 1 | 0.67 | 0.8 | 0.8 | 1 | 0.75 | 0.75 | 1 |
| userid015 | 1 | 0.86 | 0.7 | 0.67 | 0.67 | 0.8 | 0.6 | 1 | 0.75 | 0.5 | 1 |
| userid016 | 1 | 1 | 0.6 | 1 | 1 | 1 | 1 | 1 | 0.75 | 0.75 | 1 |
| userid017 | 0.89 | 0.57 | 0.7 | 1 | 0.67 | 0.8 | 1 | 1 | 1 | 0.5 | 1 |
| userid018 | 0.33 | 0.57 | 0.3 | 1 | 0 | 0.4 | 1 | 1 | 0.5 | 0.5 | 0.6 |
| userid019 | 1 | 0.86 | 0.6 | 1 | 1 | 0.6 | 1 | 1 | 1 | 1 | 1 |
| userid020 | 0.56 | 0.86 | 0.8 | 1 | 1 | 1 | 0.6 | 0.25 | 0.75 | 0.5 | 0.9 |
| Average | 0.74 | 0.79 | 0.66 | 0.78 | 0.72 | 0.72 | 0.81 | 0.87 | 0.84 | 0.7 | 0.85 |

FIG. 16

| userid | فسيكفيكهم | الأبجدية | المستضعفين | صخر | اذن | محرات | شطيره | قشطة | غليظ | غزال | $Y''_{wm\_ead}$ |
|---|---|---|---|---|---|---|---|---|---|---|---|
| userid001 | 0.78 | 1 | 0.7 | 1 | 1 | 1 | 1 | 1 | 0.75 | 0.75 | 1 |
| userid002 | 1 | 1 | 1 | 1 | 1 | 1 | 1 | 1 | 1 | 1 | 1 |
| userid003 | 1 | 1 | 1 | 1 | 1 | 1 | 1 | 1 | 1 | 1 | 1 |
| userid004 | 1 | 1 | 0.9 | 1 | 1 | 1 | 1 | 1 | 1 | 1 | 1 |
| userid005 | 1 | 1 | 0.9 | 0.67 | 0.67 | 0.4 | 0.8 | 1 | 1 | 1 | 0.9 |
| userid006 | 0.78 | 0.43 | 0.6 | 0.67 | 0.33 | 0.4 | 0.6 | 0.75 | 0.5 | 0.5 | 0.7 |
| userid007 | 1 | 1 | 1 | 1 | 0.67 | 1 | 1 | 1 | 1 | 1 | 1 |
| userid008 | 0.89 | 1 | 1 | 1 | 1 | 0.8 | 0.8 | 1 | 1 | 1 | 1 |
| userid009 | 0.89 | 0.86 | 0.9 | 1 | 1 | 1 | 1 | 1 | 1 | 0.5 | 1 |
| userid010 | 1 | 0.86 | 0.9 | 1 | 1 | 1 | 0.8 | 1 | 0.75 | 1 | 1 |
| userid011 | 1 | 0.86 | 1 | 1 | 1 | 1 | 1 | 0.75 | 1 | 1 | 1 |
| userid012 | 0.89 | 0.71 | 0.8 | 1 | 0.67 | 1 | 1 | 0.75 | 1 | 0.5 | 1 |
| userid013 | 0.89 | 1 | 0.9 | 1 | 1 | 1 | 1 | 1 | 1 | 0.75 | 1 |
| userid014 | 1 | 1 | 1 | 1 | 1 | 1 | 0.8 | 1 | 1 | 1 | 1 |
| userid015 | 1 | 1 | 1 | 1 | 1 | 1 | 0.8 | 1 | 1 | 1 | 1 |
| userid016 | 1 | 1 | 0.8 | 1 | 1 | 1 | 0.8 | 1 | 1 | 1 | 1 |
| userid017 | 0.89 | 0.86 | 0.7 | 1 | 0.67 | 0.8 | 0.8 | 0.75 | 0.75 | 1 | 1 |
| userid018 | 0.89 | 1 | 1 | 1 | 1 | 1 | 1 | 1 | 0.75 | 1 | 1 |
| userid019 | 0.89 | 0.86 | 0.8 | 0.67 | 1 | 0.8 | 1 | 1 | 0.75 | 1 | 1 |
| userid020 | 1 | 1 | 0.8 | 0.67 | 0.67 | 0.6 | 0.8 | 1 | 1 | 1 | 1 |
| Average | 0.94 | 0.92 | 0.88 | 0.93 | 0.88 | 0.89 | 0.9 | 0.95 | 0.91 | 0.9 | 0.98 |

FIG. 17

DIGITAL PEN WRITER VERIFICATION DEVICE

BACKGROUND

Technical Field

The present disclosure is directed to a computer based pattern recognition method, system and apparatus, and more particularly to handwriting recognition for verification of a target user based on the target user's hand written Arabic text.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Handwriting is a skill that most people develop over the years and is considered a behavioral distinguishing factor between individuals. It is unlikely that two different individuals produce very similar handwriting. Normally, there are variations in the handwriting of different individuals. In addition, the handwriting of a single writer may be slightly different each time. Given that the handwritings of individuals are different, handwriting can be used for individual recognition, i.e., the task of determining whether or not a handwritten text has been written by a certain person. Handwriting-based individual recognition (simply, handwriting recognition), also known as "writer verification", is of major importance in various domains, such as forensic investigations for the process of identifying authorship of documents, forensic investigations for the process of identifying authorship of partially damaged handwritten documents, signature forgery, text alteration detection, legal documents verification, etc., and thus has its applications in courts, financial institutions, educational institutes, and the like, and even in biometric applications.

Some computer vision techniques have emerged in the field of handwriting recognition to automatically identify and recognize people based on their handwritings. In general, the current approaches in this domain have focused on either manual feature extraction or have used convolutional neural networks (CNN) for automated feature extraction based on words or sub-words. Manual feature extraction on each user written sample is time consuming and the automated approaches require large datasets consisting of commonly used words (or sub-words) in language dictionary. Further, most of the known approaches have attempted to create a feature vector, a step deemed difficult since it requires language knowledge and experience to ensure that features effective for distinguishing individuals are being targeted and eventually extracted. It has been established that the performance of such writer identification model is highly dependent on the selection of features along with the applied classifier, which tends to make such approaches biased.

The Arabic language has been the focus of much research due to its widespread use as well as to the challenges that are inherent in such a complex alphabet-based language. The research related to the Arabic language can be categorized into four major areas, namely: character recognition, text to speech conversion, speech recognition, language analysis, understanding and translation. In the character recognition category, several sub-problems including handwritten text recognition, Arabic writer recognition, etc. are recognized. Various pattern recognition techniques may be used to address these types of problems.

Challenges encountered in Arabic writer recognition can be summarized in the following four items:

1. Large variations of language alphabets—the number of alphabets along with their variations in terms of their positions in words (isolated, initial, end, and middle) include 101 different shapes. Variations in Arabic alphabets may be augmented with three composed special Arabic characters (Arabic long vowels "I", "s", and "¿") with a "Hamza-") being placed on top or bottom of the character. This makes 111 total alphabet variations.
2. Alphabet similarities-many of the alphabets are very similar in shape with the only difference in the position of a single "dot" or the number of dots.
3. Human writing style-differs from individual to another in terms of character shapes, size, overlap, and how neighboring characters are being interconnected. For instance, one individual may write multiple dots as a connected line segment, while others may write them separately.
4. Cursive nature of the Arabic language—in the sense that there exists a "virtual" baseline line that connects words when writing sentences. This cursive nature distinguishes the Arabic language from others (such as Latin, Chinese, etc.).

US20160328620A1 describes a handwriting synthesis technique which includes accessing character shape images of an alphabet, determining a connection point location between two or more character shapes based on a calculated right edge position and a calculated left edge position of the character shape images, extracting character features that describe language attributes and width attributes of characters of the character shape images, the language attributes including character Kashida attributes, and generating images of cursive text based on the character Kashida attributes and the width attributes.

WO2019055849A1 describes systems and methods for categorizing patterns of characters in a document by utilizing machine based learning techniques. Specifically, the reference describes implementation of machine learning models that may be applied to P&ID diagrams to extract graphical components, such as tags and labels including symbols and process loops representing the transport of chemical components or physical components, or control processes.

WO2007075669A1 describes a system and/or a method that facilitates analyzing and/or recognizing a handwritten character. The reference provides a system that facilitates utilizing allograph data to employ handwriting character recognition. Specifically, the reference provides an interface component that can receive at least one handwritten character and a personalization component that can train a classifier based on an allograph related to a handwriting style to provide handwriting recognition for the at least one handwritten character.

CN110033052A describes a self-training method of AI recognizing handwriting font, and relates to the technical field of image recognition. The reference provides a method which comprises: firstly, establishing a general handwritten font recognition model at a cloud end by utilizing a general handwritten font data set; collecting and processing a handwritten font image of a user; training a general handwritten font recognition model; until the accuracy of verifying the handwritten font image by using the general handwritten font recognition model is not lower than a threshold value set by a user, the training of the special handwritten font recognition model of the user is completed, and all handwritten notes, receipts and other images of the user can be digitally converted and recognized by using the special handwritten font recognition model of the user.

Schlapbach et al. in "A writer identification and verification system using HMM based recognizers" (*Pattern Anal. Applic.*, (2007) 10:33-43) describe an off-line, text independent system for writer identification and verification of handwritten text lines using Hidden Markov Model (HMM) based recognizers. For each writer, an individual recognizer is built and trained on text lines of that writer. This results in a number of recognizers, each of which is an expert on the handwriting of exactly one writer.

Each of the aforementioned references suffer from one or more drawbacks hindering their adoption. For example, US20160328620A1 proposes a handwriting synthesis technique, and performance of such proposed technique is highly dependent on the selection of features which could make the described approach biased. WO2019055849A1 is primarily applicable for recognition and categorization of character-based document tags, and does not provide any means for handwriting based individual recognition. WO2007075669A1 facilitates recognizing a character associated with handwriting and can then provide optimized recognition for the handwritten characters for any particular user, but does not provide any general means for handwriting based individual recognition. CN110033052A needs to acquire hand-written script images of user that preferably covers all texts that the general hand-written script identification model can identify, which may not always be possible. Schlapbach is based on the idea of utilizing an existing HMM-based handwriting recognition system which has been optimized for text recognition for the purpose of writer identification and verification, which again may not always be possible. In addition, none of the cited references describe identification of handwritten text based on individual alphabets rather than whole words, and/or classifying the one or more user datasets with the training set, the validation set, the test set, and a reduced alphabets dataset, as in the present disclosure.

Accordingly, it is one object of the present disclosure to provide methods and systems for identification of a target user for offline or real time text-independent writer verification of text based on individual alphabets, which enables automated feature extraction and classification in the absence of a large amount of user written text.

SUMMARY

In an exemplary embodiment, a target user identification method is described. The method includes receiving, by a processing circuitry, a dataset. The dataset includes hand written Arabic words and hand written Arabic alphabets from one or more users. The method further includes removing, by the processing circuitry, whitespace around alphabets in the hand written Arabic words and the hand written Arabic alphabets in the dataset. The method further includes splitting, by the processing circuitry, the dataset into a training set, a validation set, and a test set. The method further includes classifying, by the processing circuitry, one or more user datasets from the training set, the validation set, and the test set. The method further includes identifying, by the processing circuitry, the target user from the one or more user datasets. The identification of the target user includes a verification accuracy of the hand written Arabic words being larger than a verification accuracy threshold value.

In some embodiments, the method further includes removing one or more hand written Arabic alphabets in a target user dataset associated with the target user to form a reduced alphabets dataset. Herein, the one or more hand written Arabic alphabets have a threshold value less than a performing threshold. In some embodiments, the method further includes classifying the target user dataset with the training set, the validation set, the test set, and the reduced alphabets dataset.

In some embodiments, classifying, by the processing circuitry, the one or more user datasets includes one or more user classifiers. In some embodiments, each of the one or more user classifiers includes a target class and a rest class. In some embodiments, the target class represents a class being associated with the target user and the rest class represents a class being associated with users excluding the target user.

In some embodiments, the method further includes verifying the hand written Arabic words by dividing a first number of alphabets verified to be written by the target user in the hand written Arabic words by a total number of alphabets in the hand written Arabic words.

In another exemplary embodiment, a target user identification device is described. The device includes a display panel configured to display hand written Arabic words and hand written Arabic alphabets from one or more users. The device further includes a memory configured to store the hand written Arabic words and the hand written Arabic alphabets. The device further includes a processing circuitry. The processing circuitry is configured to receive a dataset. The dataset includes the hand written Arabic words and the hand written Arabic alphabets. The processing circuitry is further configured to remove whitespace around alphabets in the hand written Arabic words and the hand written Arabic alphabets in the dataset. The processing circuitry is further configured to split the dataset into a training set, a validation set, and a test set. The processing circuitry is further configured to classify one or more user datasets from the training set, the validation set, and the test set. The processing circuitry is further configured to identify the target user from the one or more user datasets. The identification of the target user includes a verification accuracy of the hand written Arabic words being larger than a verification accuracy threshold value.

In some embodiments, the processing circuitry is further configured to remove one or more hand written Arabic alphabets in a target user dataset associated with the target user to form a reduced alphabets dataset. Herein, the one or more hand written Arabic alphabets have a threshold value less than a performing threshold. In some embodiments, the processing circuitry is further configured to classify the target user dataset with the training set, the validation set, the test set, and the reduced alphabets dataset.

In some embodiments, classifying, by the processing circuitry, the one or more user datasets includes one or more user classifiers. In some embodiments, each of the one or more user classifiers includes a target class and a rest class. In some embodiments, the target class represents a class being associated with the target user and the rest class represents a class being associated with users excluding the target user.

In some embodiments, the processing circuitry is further configured to verify the hand written Arabic words by dividing a first number of alphabets verified to be written by the target user in the hand written Arabic words by a total number of alphabets in the hand written Arabic words.

In another exemplary embodiment, a non-transitory computer readable medium having instructions stored therein that, when executed by one or more processors, cause the one or more processors to perform a method is described. The method includes receiving, by a processing circuitry, a dataset. The dataset includes hand written Arabic words and hand written Arabic alphabets from one or more users. The method further includes removing, by the processing circuitry, whitespace around alphabets in the hand written Arabic words and the hand written Arabic alphabets in the dataset. The method further includes splitting, by the processing circuitry, the dataset into a training set, a validation set, and a test set. The method further includes classifying, by the processing circuitry, one or more user datasets from the training set, the validation set, and the test set. The method further includes identifying, by the processing circuitry, the target user from the one or more user datasets. The identification of the target user includes a verification accuracy of the hand written Arabic words being larger than a verification accuracy threshold value.

In some embodiments, the method further includes removing one or more hand written Arabic alphabets in a target user dataset associated with the target user to form a reduced alphabets dataset. Herein, the one or more hand written Arabic alphabets have a threshold value less than a performing threshold. In some embodiments, the method further includes classifying the target user dataset with the training set, the validation set, the test set, and the reduced alphabets dataset.

In some embodiments, classifying, by the processing circuitry, the one or more user datasets includes one or more user classifiers. In some embodiments, each of the one or more user classifiers includes a target class and a rest class. In some embodiments, the target class represents a class being associated with the target user and the rest class represents a class being associated with users excluding the target user.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 11 shows a table (Table 2) with variations between the same alphabets written by two different users;

FIG. 12 shows a table (Table 3) of samples of user written isolated alphabets; and FIG. 13 shows a table (Table 6) of alphabet kaf_regular as written by twenty users.

FIG. 14 shows a table (Table 1) of Arabic alphabets grouped per similarity in writing style.

FIG. 16 shows a table (Table 9) of word verification accuracies using IAD alphabet models (wm_iad).

FIG. 17 shows a table (Table 10) of word verification accuracies using EAD alphabet models (wm_ead).

DETAILED DESCRIPTION

Figure 1:
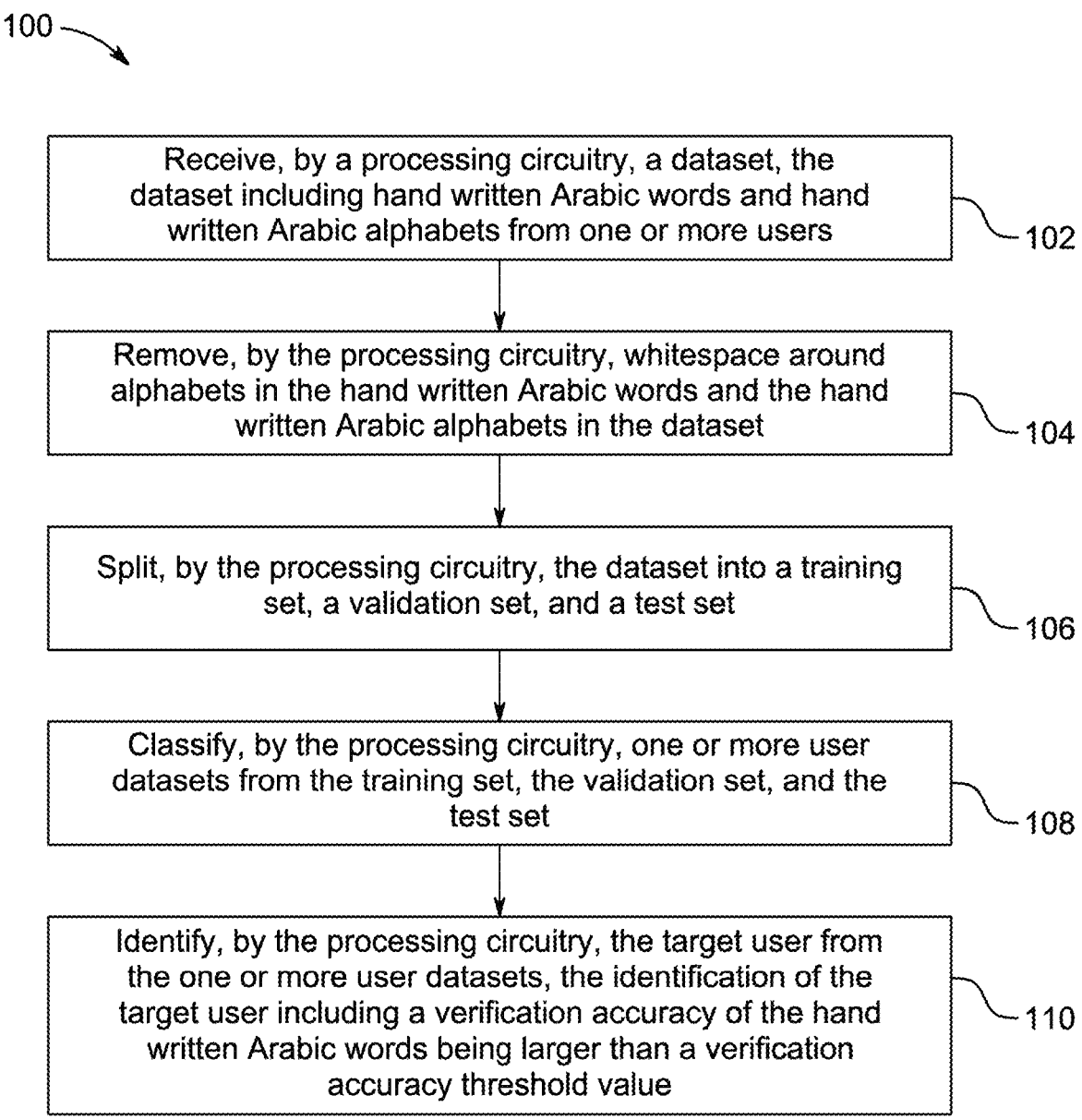
FIG. 1 is an exemplary flowchart of a target user identification method, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a device and a method for target user identification using handwriting recognition. The research related to the language may be categorized into four major areas, namely: character recognition, text-to-speech conversion, speech recognition, and language analysis, understanding and translation. Under the character recognition category field, several sub-problems have been explored with the present disclosure being related to handwriting recognition. Handwriting recognition is implemented for verification of authorship of the user-written text and is thus useful in several application domains. For example, there is an increasing trend towards online assessments, which require verification of handwritten student assessments.

Handwriting recognition can be classified broadly into two sub-categories: verification and identification. The verification process is considered as a two-fold classification problem that involves the decision of rejecting or accepting the authentication of a handwriting sample with other samples. On the other hand, the identification process is a multinomial classification that attempts to identify a genuine writer among a list of many writers based on handwriting similarities. The present disclosure relates to the identification process which, generally, has broader applications, including for forensic investigations and the like. It is especially useful during forensic investigation of partially damaged handwritten documents.

The present disclosure is largely described in terms of handwriting recognition for the Arabic language. The present disclosure provides an approach to deal with the challenges encountered with the nature of the Arabic language, including large variations of language alphabets (e.g., the number of alphabets along with their variations in terms of their positions in words, such as isolated, initial, end, and middle, include 101 different shapes—see FIG. 14 Table 1); alphabet similarities (e.g., many of the alphabets are very similar in shape, however, the only difference may be the position of a single "dot" or the number of dots); human writing style (e.g., differs from one individual to another in terms of character shapes, size, overlap, and how neighboring characters are being interconnected); and cursive nature of the Arabic language (in the sense that there exists a "virtual" baseline line that connects words when writing sentences). All of the aforementioned challenges have made the problem of recognizing individuals based on their handwriting of Arabic text very appealing, since if the challenges that are inherent in such a complex alphabet-based language can be overcome, then the present disclosure can be applied in general to all other suitable languages without many modifications. All said, it is appreciated that although the embodiments of the present disclosure have been described and demonstrate the applicability of the proposed method and device using Arabic text, the proposed method and device are generic and can be used for any suitable language without any limitations. Hereinafter, any reference to Arabic text, Arabic words, Arabic alphabets, or Arabic language in general should be construed to be exemplary only and not limiting to the present disclosure in any manner unless otherwise identified as such.

As may be understood by a person skilled in the art, writer identification using handwriting approaches can be categorized into two broad categories: text-dependent and text-independent. Text-dependent approaches using words for writer identification (or verification) have focused on learning from a small set of user written words. Although this approach works quite well on the selected words, it is difficult to scale to include all possible words and their variants in the Arabic dictionary. For instance, the Arabic language is known to have close to 12 million distinct words. This high word count is due to the fact that individual words can have different representations depending upon the context. In Arabic language, nouns have different representations depending upon several factors, including whether they represent a singular, double, or plural entity; whether they are used as the subject, object, or possessive noun; and whether they are proper or common noun. It is therefore difficult to scale a text-dependent approach for the reasons, such as dataset collection will have to include all words written by each user and dataset size will become unreasonably large. Therefore, the present disclosure proposes handwriting recognition approach for offline "text-independent" handwriting recognition of written text to address the individual identification problem.

In particular, the present disclosure describes a text-independent writer verification approach that relies on individual Arabic alphabets. This approach has the advantage that the set of Arabic alphabets is limited. Thus, a deep learning model can be trained on a complete set of alphabets as opposed to considering an unreasonably large word-based dataset. The writer verification can then be performed by extracting alphabets from the user-written words and then using the learned alphabet model to identify/verify the target user. This approach may therefore be scaled to any word in the Arabic dictionary and is not limited by the number of unique words captured in the dataset. This is in contrast to known text-independent approaches that have targeted learning based on several types of statistical, structural, and model based features (such as grapheme features, strokes features, character level features, etc.) extracted from words or paragraphs. The present disclosure enables automated feature extraction and classification in the absence of a large amount of user written text.

Figure 3:
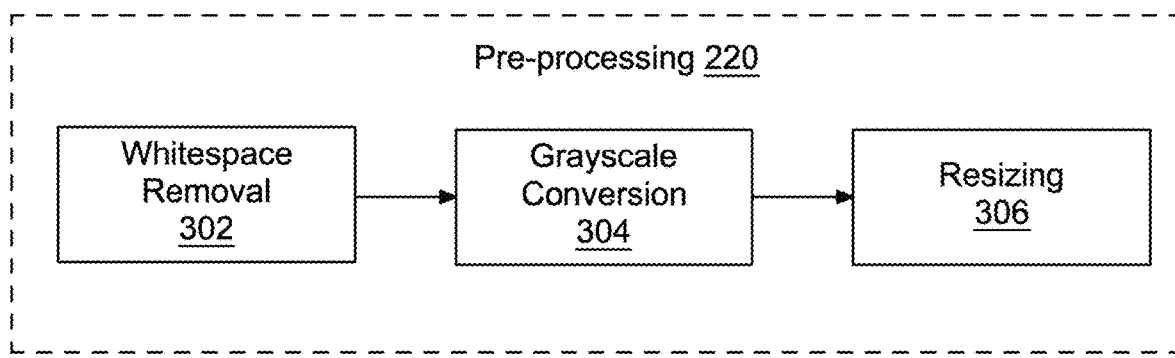
FIG. 3 is a schematic diagram of a pre-processing stage of the process of FIG. 2 showing sub-stages involved therein, according to certain embodiments.
Figure 4:
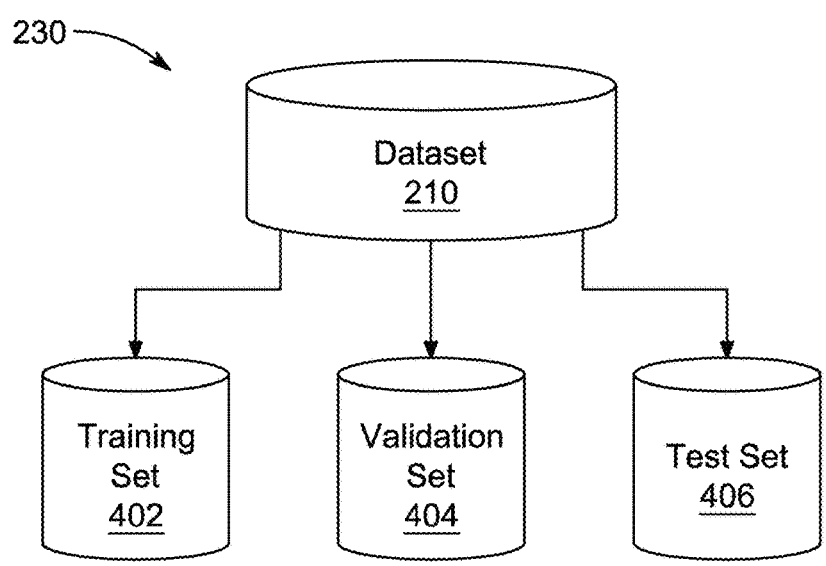
FIG. 4 is a schematic diagram of a splitting stage of the process of FIG. 2 showing sub-stages involved therein, according to certain embodiments.
Figure 5:
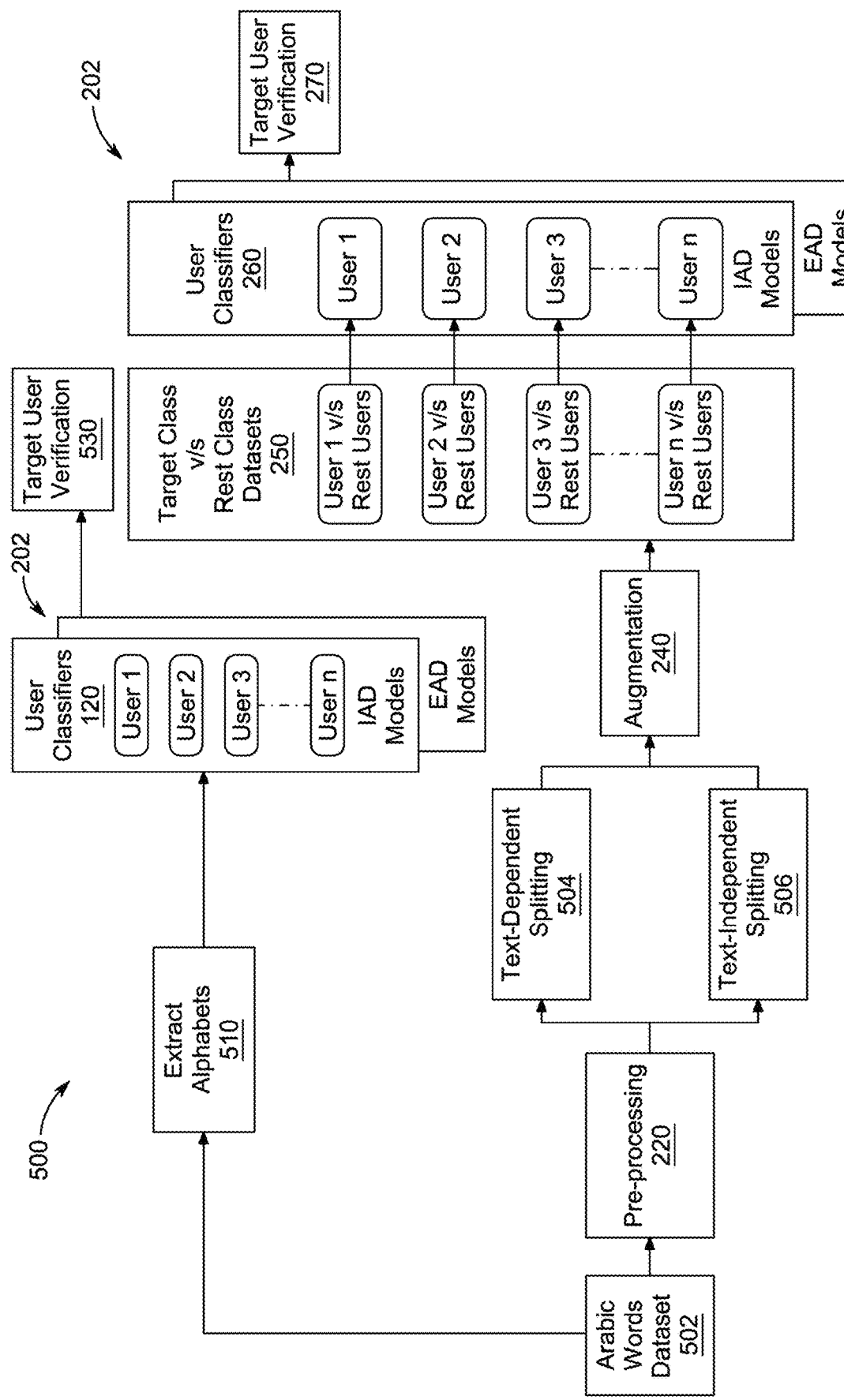
FIG. 5 is a schematic diagram of a process with various stages for use of the model for target user identification using hand written text, according to certain embodiments.

Referring to FIG. 1, an exemplary flowchart of a target user identification method 100 (hereinafter, sometimes simply referred to as "method 100") is illustrated. The method 100 proposes an approach for offline text-independent writer verification of Arabic text based on individual alphabets. The steps of the present method 100 are performed by a processing circuitry, such as a processing circuitry 601 (see FIG. 6) which has been described later in reference to FIG. 6. Also, the present method 100 has been described in the proceeding paragraphs in conjunction with and references to a process 200 of FIG. 2 and a process 500 of FIG. 5. Further, the present method 100 has been described in conjunction with and references to stages of the process 200 of FIG. 2 as depicted in FIG. 3 and FIG. 4. Herein, the process 200 of FIG. 2 is implemented for developing a model 202 (as shown in FIG. 2) to be used for target user identification as per the present disclosure, and the process 500 of FIG. 5 is implemented for use of the model 202 for target user identification using hand written text.

Figure 2:
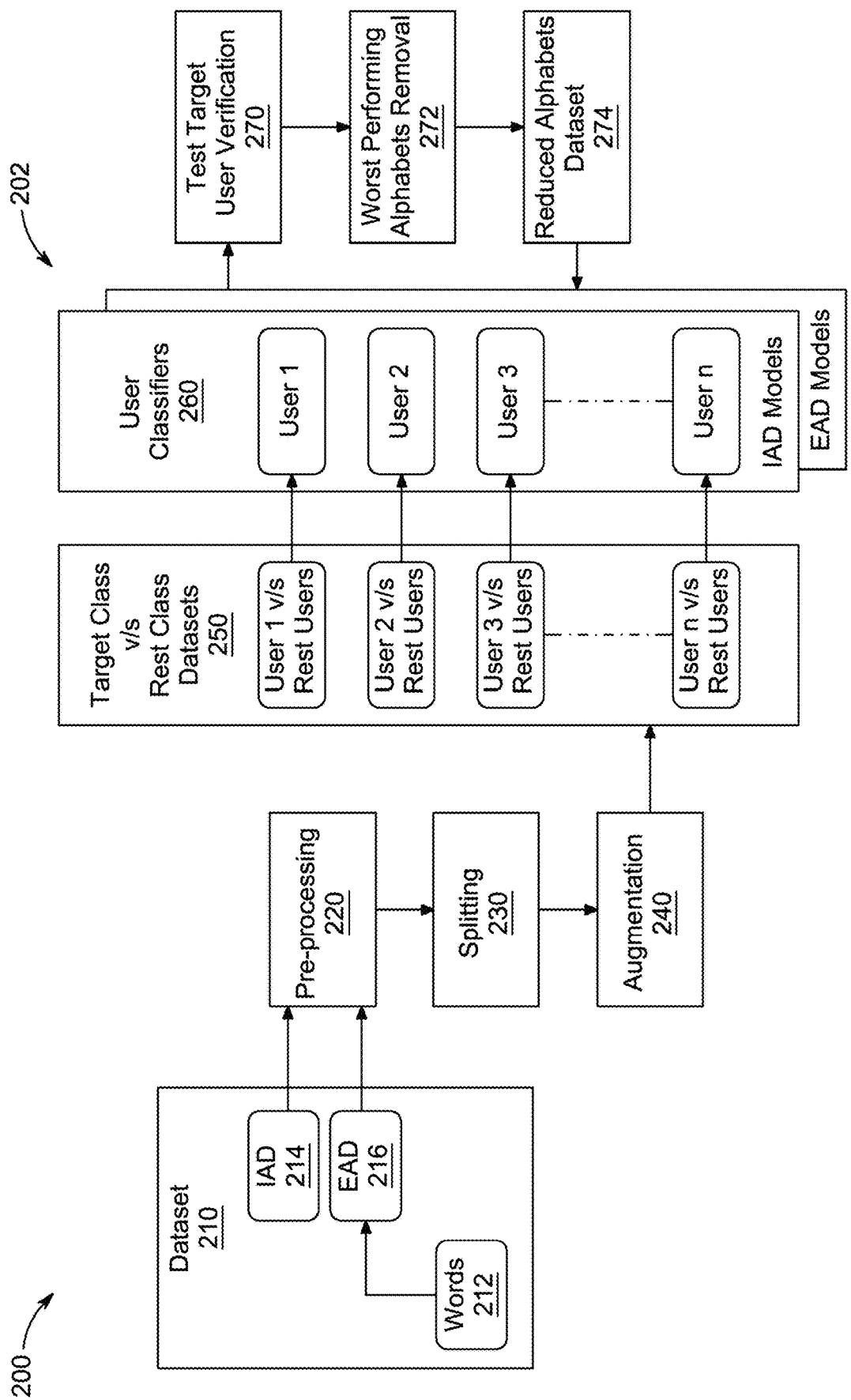
FIG. 2 is a schematic diagram of a process with various stages for developing a model to be used for target user identification, according to certain embodiments.

At step 102, the method 100 includes receiving, by the processing circuitry 601, a dataset (such as a dataset 210, as shown in FIG. 2). As illustrated in FIG. 2, the dataset 210 includes hand written Arabic words 212 and hand written Arabic alphabets 214 from one or more users. Herein, the hand written Arabic alphabets 214 are written by the users in isolation to the hand written Arabic words 212. The dataset 210 is generated by using images of the hand written Arabic words 212 and the hand written Arabic alphabets 214 from the one or more users. In an example, such images may be obtained from scans of pages of hand written text, having the hand written Arabic words 212 and/or the hand written Arabic alphabets 214, from the one or more users. In another example, the one or more users may be asked to write text on an input device (such as a touch screen device), including the hand written Arabic words 212 and the hand written Arabic alphabets 214. In another example, the images may be obtained from photographs of pages of hand written text, having the hand written Arabic words 212 and/or the hand written Arabic alphabets 214, from the one or more users obtained, for examples, from mobile camera, digital cameras and such imaging capturing devices.

In the Arabic language, words use different forms of the same alphabet depending on whether the alphabet occurred at the beginning, middle, end, or in isolation (regular). Therefore, the dataset 210 includes all different variants (begin, middle, end, and regular) of each Arabic alphabet. It may be appreciated that the dataset 210 needs these many possible variants of the hand written Arabic alphabets 214, also referred to as Isolated Alphabets Dataset (IAD), to train the model 202 on Arabic alphabets. Further, it may be understood that the Arabic alphabets writing style varies depending on whether the alphabet is written as isolated alphabets (not part of a word) or as part of a word. That is, there are substantial variations in the same alphabet written by the same user depending on whether it is written in isolation or as part of the word. Therefore, in addition to all possible variants of the hand written Arabic alphabets 214, the dataset 210 also includes certain hand written Arabic words 212 that cover the entire set of Arabic alphabets.

Further, the Arabic alphabets are extracted (manually or automatically) from each of the hand written Arabic words 212 to generate an Extract Alphabets dataset (EAD) 216. For this purpose, images of the Arabic alphabets may be cropped (snipped) out of images of the hand written Arabic words 212.

Thus, the IAD 214 includes the Arabic alphabets written in isolation (not part of word), while the EAD 216 includes the Arabic alphabets extracted from the hand written Arabic words 212. It may be understood by a person skilled in the art that Arabic alphabets can be classified into 19 different groups depending on their similarity in writing style. Therefore, the IAD 214 includes only one alphabet from each group of a similarly styled alphabet. Thus, the IAD 214 includes a total of 65 different variants of Arabic alphabets within 19 groups. Further, herein, each user may be asked to write each alphabet variant ten times. In an example with 20 number of users, this would result in the IAD 214 including about 13000 alphabets. Further, the EAD 216 includes alphabets extracted from hand written Arabic words 212. For this purpose, each of the users may be asked to write ten Arabic words for ten times. As discussed, the set of Arabic words are selected such that it covers the entire set of Arabic alphabets. In the present example with 20 number of users, the EAD 216 includes at least ten samples of each Arabic alphabet, and a total of about 10,780 extracted Arabic alphabets.

Further at step 104, the method 100 includes removing, by the processing circuitry 601, whitespace around alphabets in the hand written Arabic words 212 and the hand written Arabic alphabets 214 in the dataset 210. This step 104 corresponds to a pre-processing stage 220 of the process 200 of FIG. 2 (at least partially). As illustrated in FIG. 2, once the IAD 214 and the EAD 216 are defined, the alphabets therein are moved to the pre-processing stage 220. FIG. 3 is a schematic diagram of the pre-processing stage 220 of the process 200 showing sub-stages involved therein. The pre-processing stage 220 ensures that the extracted alphabets from the hand written Arabic words 212 and the hand written Arabic alphabets 214 may be appropriate for further processing for purposes of the present disclosure.

In the pre-processing stage 220, first a whitespace removal sub-stage 302 is executed. In the whitespace removal sub-stage 302, the whitespace around alphabets in the hand written Arabic words 212 and the hand written Arabic alphabets 214 in the dataset 210 is removed. Particularly, the whitespace around extracted alphabets as cropped out from the hand written Arabic words 212 is removed. This ensures that any stray marks or the like around the alphabets may be removed along with the whitespace, so that such stray marks or the like may not affect handwriting recognition which is based on such individual alphabets (extracted or otherwise) as per the present disclosure. There are known techniques, such as, but not limited to, crop bounds, edge detection, etc. for performing whitespace removal process which would be contemplated by a person skilled in the art and thus the same have not been discussed herein for the brevity of the present disclosure.

Further in the pre-processing stage 220, a grayscale conversion sub-stage 304 is executed. In the grayscale conversion sub-stage 304, the cropped images with the corresponding whitespaces removed are converted to grayscale (i.e., any colors therein are removed), so as to eliminate any effect of colored text in one or more images of the alphabets versus black text in other images of the alphabets, or the like. There are known techniques, such as, but not limited to, averaging, desaturation, luma, etc. for grayscale conversion process which would be contemplated by a person skilled in the art and thus the same have not been discussed herein for the brevity of the present disclosure.

Further in the pre-processing stage 220, a resizing sub-stage 306 is executed. In the resizing sub-stage 306, each of the cropped images of the alphabet with the corresponding whitespaces removed and being converted to grayscale may further be reduced (or enlarged) to a standard size to allow for consistent further processing thereof. In an example, the images may be resized to 64×64 pixels. There are known techniques, such as, but not limited to, nearest-neighbor interpolation, bilinear and bicubic algorithms, Fourier-transform methods, edge-directed interpolation, etc. for image resizing process which would be contemplated by a person skilled in the art and thus the same have not been discussed herein for the brevity of the present disclosure.

It may be appreciated that in other examples, the grayscale conversion sub-stage 304 and/or the resizing sub-stage 306 may be executed earlier relative to the whitespace removal sub-stage 302, while still achieving the same results for the pre-processing stage 220. In still other examples, the grayscale conversion sub-stage 304 may be executed before the resizing sub-stage 306, while still achieving the same results for the pre-processing stage 220. In general, the three sub-stages 302, 304, 306 may be executed in any suitable order for the pre-processing stage 220 without departing from the spirit and the scope of the present disclosure.

At step 106, the method 100 includes splitting, by the processing circuitry 601, the dataset 210 into a training set, a validation set, and a test set. This step 106 corresponds to a splitting stage 230 of the process 200 of FIG. 2, which has further been described in reference to FIG. 4. As illustrated in FIG. 4, the dataset 210, post the pre-processing stage 220, was split into a training set 402, a validation set 404, and a test set 406. In the present examples, the dataset 210 is divided in a ratio of 60:20:20, with 60 for the training set 402, 20 for the validation set 404 and 20 for the test set 406. It may be understood that in other examples the given ratio may vary without any limitations. In the splitting stage 230, it is ensured that each alphabet variant is present with generally the same ratio in each of the training set 402, the validation set 404 and the test set 406. It may be understood that the training set 402 is used as sample of data to fit the model 202, the validation set 404 is used as a sample of data to provide an unbiased evaluation of the model 202 fit on the training set 402 while tuning model hyperparameters, and the test set 406 is used as a sample of data to provide an unbiased evaluation of the final model 202 fit on the training set 402.

It may be noted that in order to implement user verification, the present problem is posed as one vs. rest (OVR) classifier. Herein, binary classifiers are developed based on the number of users, with one for each of the one or more users. Each user would then be verified by using its own model. In the present example with 20 number of users, it may be appreciated that the dataset 210 may therefore be divided into 20 different datasets where each dataset represents a single classifier for the training set 402, the validation set 404 and the test set 406 (with a 60:20:20 ratio) with two classes, namely a target class (representing the target user of corresponding classifier) and a rest class (representing rest of the users). This is explained later in more detail.

Now, in the present example with 20 number of users, since the target class would have 18 times fewer instances than the rest class; in order to balance the dataset 210, the target class data needs to be augmented 18 times. In an aspect of the present disclosure, as illustrated in FIG. 2, the process 200 includes an augmentation stage 240, subsequent to the splitting stage 230. In the augmentation stage 240, the data (alphabets) in the training set 402, the validation set 404, and the test set 406 is augmented with a random shift (left, right, up and down) and/or random rotation of the alphabets. In an example, the data (alphabets) in the training set 402, the validation set 404, and the test set 406 is augmented with a 5 percent, 10 percent, 15 percent, 20 percent or 25 percent random shift (left, right, up and down) along with 10 degrees random rotation, optionally with rotation of 15, 30, 45, 60 and/or 90 degrees, or ranges or sub-values between the stated values. It may be appreciated that such values for the shift and rotation are exemplary only and shall not be construed as limiting to the present disclosure in any manner. The augment dataset may then be used for training of the model 202 for handwriting recognition.

At step 108, the method 100 includes classifying, by the processing circuitry 601, one or more user datasets from the training set 402, the validation set 404, and the test set 406. This step 108 corresponds to a Target Class v/s Rest Class Datasets stage 250 (hereinafter, referred to as "stage 250") and a User Classifiers stage 260 (hereinafter, referred to as "stage 260") of the process 200 of FIG. 2. In the stage 250, a user dataset is generated for each of the one or more users using the corresponding training set 402, the corresponding validation set 404 and the corresponding test set 406 (as defined in the splitting stage 230 and the augmenting stage 240). Herein, the user dataset is classified as a target user dataset when the corresponding user is being considered as the target user. For this purpose, in the method 100, classifying, by the processing circuitry 601, the one or more user datasets includes one or more user classifiers. Further, in the method 100, each of the one or more user classifiers includes a target class and a rest class. In the present method, the target class represents a class being associated with the target user and the rest class represents a class being associated with users excluding the target user. Such binary classification is used as multi-class classification tasks may not be applicable for common training algorithms including logistic regression and the like, at least not directly. Therefore, instead, a heuristic approach can be used to split a multi-class classification problem into multiple binary classification datasets and train a binary classification model each. In the present disclosure, One-vs-Rest (OvR) heuristic method is implemented. One-vs-rest (OvR for short, also referred to as One-vs-All or OvA) involves splitting the multi-class dataset into multiple binary classification problems. A binary classifier is then trained on each binary classification problem and predictions are made using the model that is the most confident.

For the purposes of the present disclosure, in the stage 260, the one or more user datasets includes the one or more user classifiers, including the target class and the rest class (as described above). As discussed, the user dataset is classified as the target user dataset when the corresponding user is being considered as the target user. Herein, the user dataset is classified as the target user dataset based on the target class. Further, the other user datasets are considered and grouped under the rest class for the target user. Thereby, the model 202 is trained for each of the one or more users using the corresponding user classifiers in the stage 260. In an aspect of the present disclosure, the model 202 may include a corresponding IAD model trained based on the IAD 214 and a corresponding EAD model trained based on the EAD 216 for each of the one or more users. Each user would then be verified by using its own model. The dataset 210 was therefore divided into different user datasets where each dataset represents a single classifier's training.

In the present disclosure, the model 202 is implemented as a convolutional neural network (CNN), thus also referred to as CN model 202. Herein, "convolution" is a mathematical operation on two functions, f and g, and produces a third function that may be viewed as a modified version of one of the original functions. The third function generally includes area overlap between the two functions as a function of the amount that one of the original functions is translated. In general, the term "convolutional neural network (CNN)" refers to a type of neural network where the individual neurons are tiled in such a way that they respond to overlapping regions in the visual field. Generally, the convolutional neural network (CNN) will employ local receptive fields, shared weights, and pooling to process imagery. Local receptive fields may be considered as connections of input pixels to a layer of hidden neurons. As an example, each neuron in the first hidden layer corresponds to a small, localized region of the input image. The region of the input image that corresponds to the hidden neuron is called the "local receptive field" for that hidden neuron. Each of the hidden neurons in the first hidden layer use the same weights and bias as the other hidden neurons, and thus have "shared weights." This means that all the neurons in the first hidden layer detect exactly the same feature just in different locations. The resulting map from the input layer is referred to as a "feature map," and the weights defining the feature map as the "shared weights." "Pooling layers" are usually used immediately after convolutional layers. Pooling layers simplify the information in the output from the convolutional layer. That is, a pooling layer takes each feature map output from the convolutional layer and prepares a condensed feature map. One common procedure for pooling is known as "max-pooling." In max-pooling, a pooling unit simply outputs the maximum activation of the input region (output from the feature map). In the present disclosure, the CNN model 202 is optimized using hyper-parameter tuning to improve the validation accuracy, as would be contemplated by a person skilled in the art.

In embodiments the Arabic alphabets are limited in number (e.g., 25, 26, 28, 30, 35 etc. alphabets), thus the required training set can be collected from few paragraphs written by users. The CNN based writer verification approach described herein may use hand-written alphabets and then apply trained models to provide writer verification based on handwritten words. This text-independent approach is may provide better accuracy than merely training a CNN classifier on whole words. It also requires lesser data collection (as multiple copies of the same alphabet are available per user written text).

In an aspect of the present disclosure, the method 100 includes removing one or more hand written Arabic alphabets in the target user dataset associated with the target user to form a reduced alphabets dataset, with the one or more hand written Arabic alphabets having a threshold value less than a performing threshold. A performing threshold value that discards 25% worst performing alphabets generally provides good enough accuracy. However, the selection of actual performing threshold value depends upon specific applications and the number of alphabets available in the document being verified.

Some applications include setting a lower threshold value to eliminate a higher number of alphabets to increase overall performance (accuracy). While in other applications, recovered document may have only limited number of alphabets which limits the number of alphabets that can be eliminated.

In one embodiment a performing threshold is related to a total number of alphabets. As the number of alphabets increases a greater proportion of the alphabets may be discarded thus the performing threshold may increase.

In addition partially damaged alphabets or alphabets that are not legible may be removed and are not counted towards the total number of alphabets. The degree of damage to a handwritten document may be described as a portion of the total alphabets. A partially damaged document may have, for example 0.1-95% damage calculated as the number of damaged alphabets (e.g., illegible or unrecognizable alphabets) relative to the total number of alphabets in the document. The degree of damage may include ranges such as 5-90%, 10-80%, 15-75%, 20-70%, 30-60%, or 40-50%.

For this purpose, in the process 200 of FIG. 2, a test target user verification stage 270 (hereinafter, referred to as "stage 270") is executed. In the stage 270, the CNN model 270, as trained on the training set 402, is tested for the target user verification based on the validation set 404 and/or the test set 406. Further, a worst performing alphabets removal stage 272 (hereinafter, referred to as "stage 272") is executed. In the stage 272, one or more hand written Arabic alphabets are identified which may be affecting the performance of the model 202 for the target user verification in the stage 270. In general, these worst performing alphabets may include illegible alphabets, alphabets having some stray marks, etc. For this purpose, the threshold value of each of the one or more hand written Arabic alphabets is determined, for example using Shapley Value analysis or the like. The threshold value is compared to the performing threshold (which, in one example, may be defined as per the desired application) and the hand written Arabic alphabets with the threshold value less than the performing threshold are identified as the worst performing alphabets. Further, in a stage 274 of the process of FIG. 2, a reduced alphabets dataset (also referred by the numeral 274) is generated. Herein, the reduced alphabets dataset is generated by removing (discarding) the identified worst performing alphabets from the dataset 210. Such reduced alphabets dataset provide suitable data for training of the model 202 for improving its accuracy for the target user verification.

In an aspect of the present disclosure, the method 100 further includes classifying the target user dataset with the training set 402, the validation set 404, the test set 406, and the reduced alphabets dataset 274. That is, as shown in the process of FIG. 2, the model 202 may be re-trained based on the reduced alphabet dataset 274. As may be contemplated that for any given dataset, not every sample may contribute equally to training a machine learning model. Some data may be irrelevant, or redundant, and may even reduce the accuracy of the model trained thereby, like mislabeled data. Therefore, the present method 100 uses the reduced alphabets dataset 274 for training of the model 202, and thereby classifying the target user dataset. This process may be repeated till the model 202 may be sufficiently accurate (as required for desired application) for the target user verification.

Referring again to FIG. 1, at step 110, the method 100 includes identifying, by the processing circuitry 601, the target user from the one or more user datasets. Herein, the identification of the target user includes a verification accuracy of the hand written Arabic words being larger than a verification accuracy threshold value. That is, the individual user datasets trained on isolated and extracted alphabets can then be used as components to verify users based other written words. This step 110 corresponds to the process 500 of FIG. 5 which provides various stages for use of the model 202 (as developed in the process 200 of FIG. 2) for target user identification using hand written text. As shown in FIG. 5, first, an Arabic words dataset (which may be in the form of written text, with the two terms being interchangeably used) is received at a block 502. In the process 500 of FIG. 5, the steps involved in the development of the model 202 (as depicted in a lower portion of FIG. 5) are generally the same as described with reference to the process 200 of FIG. 2, and thus those details are not repeated herein for the brevity of the present disclosure. In an aspect of the present disclosure, as shown in FIG. 5, the splitting stage (like the splitting stage 230 of FIG. 2) may involve text-dependent splitting (as represented by block 504) and text-independent splitting (as represented by block 506). In the text-dependent splitting, same set of words may be used (for extracting the alphabets therefrom) to generate the training set 402 and the validation set 404 as well as the test set 406; and in the text-independent splitting, different set of words may be used (for extracting the alphabets therefrom) to generate the training set 402 and the validation set 404 in comparison to the test set 406. Further, the alphabets are extracted from the received written text at a block 510. Further, the extracted alphabets may be pre-processed. The pre-processing may include whitespace removal, grayscale conversion and resizing, as described above in reference to FIG. 3. These pre-processed extracted alphabets may then be used by the trained model 202 (as obtained by the process 200 of FIG. 2) for identification of the target user, i.e., target user verification at a block 530.

The step 110 of the present method 100 provides a text-independent approach that can be used for any user written word. The individual writer verification models trained on isolated and extracted alphabets were then used as components to verify users based on their written words. The approach works by extracting individual alphabets ($a_i$) from each user written word (w), where w= {$a_1, a_2, \ldots, a_m$}. Each $a_i \in$ w can then be used to verify the target user ($user_j$) using their corresponding alphabet based model ($F_{user_j}$) such that:

$$F_{user_j}(a_i) = \begin{cases} 1; a_i \text{ is verified to be written by } user_j \\ 0; a_i \text{ is verified to be written by } user_j \end{cases}$$

In an aspect of the present disclosure, the method 100 further includes verifying the hand written Arabic words by dividing a first number of alphabets verified to be written by the target user in the hand written Arabic words by a total number of alphabets in the hand written Arabic words. That is, herein, the verification accuracy ($\beta$) of each hand written Arabic word (w) for the target user ($user_j$) is computed as:

$$\beta = \frac{\sum_i F_{user_j}(a_i)}{|w|}$$

In the present examples, the verification accuracy threshold value is considered as 0.5 for the purposes of the present disclosure. That is, if $\beta \geq 0.5$, then the hand written Arabic word (w) is verified to be written by the target user ($user_j$).

Figure 6:
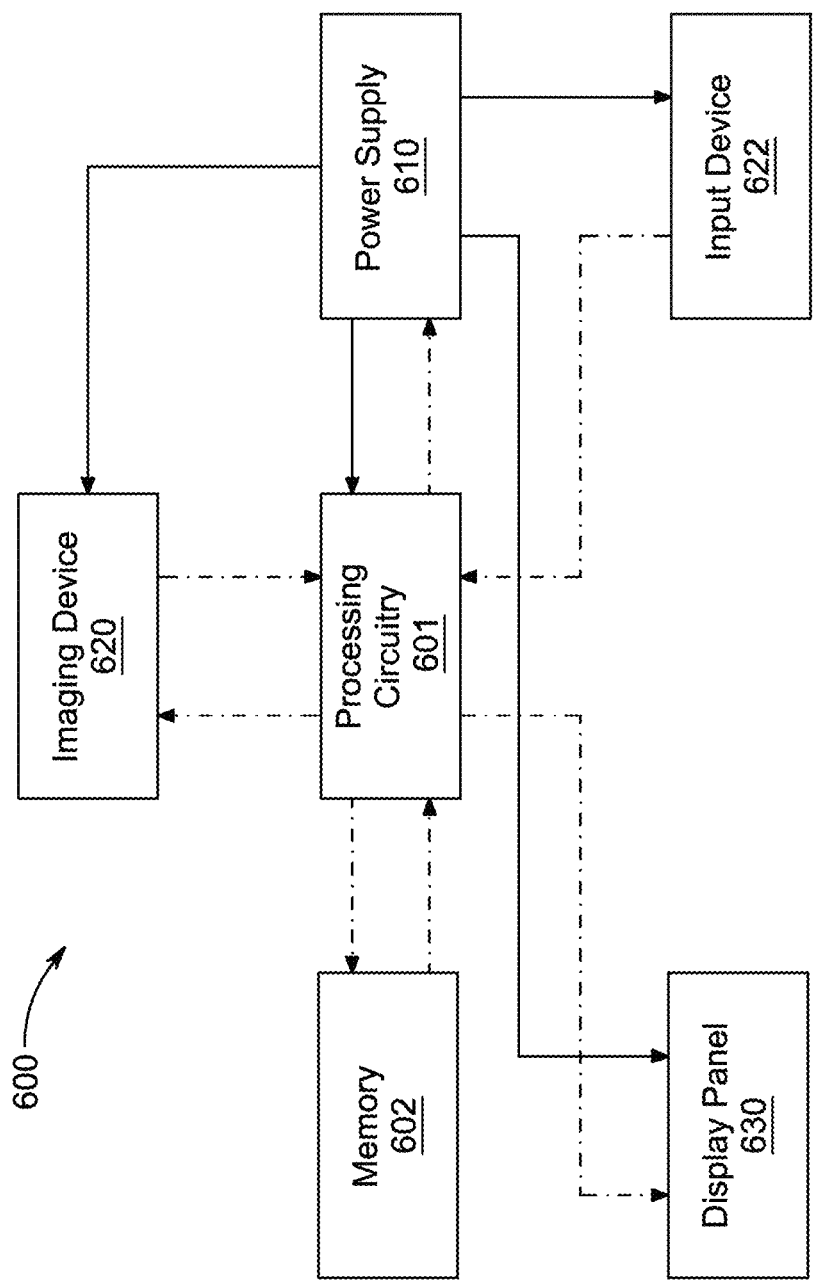
FIG. 6 is a schematic diagram of a target user identification device, according to certain embodiments.

Referring to FIG. 6, illustrated is a schematic diagram of a target user identification device 600 (hereinafter, sometimes, referred to as device 600). the present device 600 provides a system to identify authorship of handwritten text based on individual alphabets. The device 600 is used for offline text-independent writer verification of Arabic text based on individual alphabets. The device 600 includes the processing circuitry 601. The processing circuitry 601 may be associated with a memory 602. It may be appreciated that the processing circuitry 601 may be in the form of a controller which may be any processing device, system or part thereof. Such controller may be implemented in hardware, firmware or software, or some combination of at least two of the same. It should be noted that the functionality associated with any particular controller may be centralized or distributed, whether locally or remotely. Such controller may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. Further, the memory 602 may include one or more non-transitory computer-readable storage media that can be read or accessed by other components in the device. The memory 602 may be any computer-readable storage media, including volatile and/or non-volatile storage components, such as optical, magnetic, organic or other memory or disc storage, which can be integrated in whole or in part with the device. In some examples, the memory 602 may be implemented using a single physical device (e.g., optical, magnetic, organic or other memory or disc storage unit), while in other examples, the memory 602 may be implemented using two or more physical devices without any limitations.

The device 600 may further include a power supply 610. The term "power supply", as used herein, may include a battery, an AC/DC power supply, a renewable power source, a non-renewable power source, a generator, and the like, without any limitations. The device 600 may further include an imaging device 620. The term "imaging device", as used herein, covers any kind of structure for capturing an image or a series of images. The imaging device 620 may be disposed in signal communication with the processing circuitry 601, which may provide functionality of CCD, CMOS chip, etc. as required for processing captured images by the imaging device 620.

In one embodiment of the present disclosure the imaging device is a single alphabet or single word imaging device. Preferably the imaging device includes a stage for securing a substrate (for example a sheet of paper) on which an individual has written alphabets and/or words. The stage may have a series of holes provided therein connected to a vacuum or low pressure source which serves to hold the substrate in place on the stage during imaging. A microelectronic camera device mounted on an X-Y motion system, similar to X-Y control and manipulation of a printer head of a printer, moves laterally and/or horizontally across the page recording individual images of words and/or alphabets present on the substrate. The camera includes a light/dark detector for identifying beginning points and endpoints of words. In an embodiment end points of words are identified by continuous absence of writing features above a horizontally oriented cursive line or baseline. The imaging device permits quick and reproducible image capture and image storage of alphabets and words associated with a unique writer.

As shown, the imaging device 620 may be powered by the power supply 610. Further, the device 600 may include an input device 622. The input device 622 may be in the form of a digital pen (stylus) and a touchscreen arrangement, or the like for receiving the hard written text from the one or more users. The input device 622 may communicate the received hard written text to the processing circuitry 601. As shown, the input device 622 may be powered by the power supply 610. Further, the device 600 includes a display panel 630. The display panel 630 may be connected to the processing circuitry 601 to receive the processed images to be rendered thereby. It is to be understood that, when reference is made in this disclosure to the term "display panel" this refers generically either to a display screen on its own or to the screen and an associated housing, drive circuitry and possibly a physical supporting structure, of which all, or part of is provided for displaying captured images.

In the target user identification device 600, the display panel 630 is configured to display hand written Arabic words and hand written Arabic alphabets from the one or more users. Further, the memory 602 is configured to store the hand written Arabic words and the hand written Arabic alphabets. Furthermore, the processing circuitry 601 is configured to receive a dataset (such as the dataset 210). Herein, the dataset 210 may be stored in the memory 602. The dataset 210 includes the hand written Arabic words and the hand written Arabic alphabets. The processing circuitry 601 is further configured to remove whitespace around alphabets in the hand written Arabic words and the hand written Arabic alphabets in the dataset 210. The processing circuitry 601 is further configured to split the dataset 210 into a training set (such as the training set 402), a validation set (such as the validation set 404), and a test set (such as the validation set 404). The processing circuitry 601 is further configured to classify one or more user datasets from the training set 402, the validation set 404, and the test set 406. The processing circuitry 601 is further configured to identify the target user from the one or more user datasets. Herein, the identification of the target user including a verification accuracy (such as the verification accuracy 'β') of the hand written Arabic words being larger than a verification accuracy threshold value.

In some embodiments, the processing circuitry 601 is further configured to remove one or more hand written Arabic alphabets in a target user dataset associated with the target user to form a reduced alphabets dataset (such as the reduced alphabets dataset 274), wherein the one or more hand written Arabic alphabets have a threshold value less than a performing threshold. In some embodiments, the processing circuitry 601 is further configured to classify the target user dataset with the training set 402, the validation set 404, the test set 406, and the reduced alphabets dataset 274. Matching or comparing against the threshold may be accomplished such that any alphabet with average error higher than the performing threshold value is eliminated and the rest of the alphabets are used to classify target user.

In some embodiments, classifying, by the processing circuitry 601, the one or more user datasets includes one or more user classifiers. In some embodiments, each of the one or more user classifiers includes a target class and a rest class. In some embodiments, the target class represents a class being associated with the target user and the rest class represents a class being associated with users excluding the target user.

In some embodiments, the processing circuitry 601 is further configured to verify the hand written Arabic words by dividing a first number of alphabets verified to be written by the target user in the hand written Arabic words by a total number of alphabets in the hand written Arabic words.

The present disclosure further provides a non-transitory computer-readable storage medium storing computer-readable instructions that, when executed by a computer, cause the computer to perform a method. Herein, the "non-transitory computer-readable storage medium" is equivalent to the memory 602 of the target user identification device 600 as illustrated in FIG. 6, with the two terms being interchangeably used. Further, the "computer" is equivalent to the target user identification device 600 itself, with the two terms being interchangeably used. The method performed by the computer is equivalent to the method 100 as illustrated in FIG. 1. The method 600 includes receiving, by the processing circuitry 601, the dataset 210. The dataset 210 includes hand written Arabic words and hand written Arabic alphabets from one or more users. The method 100 further includes removing, by the processing circuitry 601, whitespace around alphabets in the hand written Arabic words and the hand written Arabic alphabets in the dataset 210. The method 100 further includes splitting, by the processing circuitry 601, the dataset into the training set 402, a validation set 404, and a test set 406. The method 100 further includes classifying, by the processing circuitry 601, one or more user datasets from the training set 402, the validation set 404, and the test set 406. The method 100 further includes identifying, by the processing circuitry 601, the target user from the one or more user datasets. The identification of the target user includes the verification accuracy ($\beta$) of the hand written Arabic words being larger than the verification accuracy threshold value.

In some embodiments, the method 100 further includes removing one or more hand written Arabic alphabets in the target user dataset associated with the target user to form the reduced alphabets dataset 274. Herein, the one or more hand written Arabic alphabets have the threshold value less than the performing threshold. In some embodiments, the method 100 further includes classifying the target user dataset with the training set 402, the validation set 404, the test set 406, and the reduced alphabets dataset 274.

In some embodiments, classifying, by the processing circuitry 601, the one or more user datasets includes one or more user classifiers. In some embodiments, each of the one or more user classifiers includes the target class and the rest class. In some embodiments, the target class represents a class being associated with the target user and the rest class represents a class being associated with users excluding the target user.

Writer verification is an active area of research and several approaches have been proposed for offline text-independent writer verification of documents. The differences in people's handwriting are most likely to manifest and be very noticeable when the considered writing language has many variations in terms of the language dimension such that the number of existing alphabets, shapes, and their deviations when appearing in words compared to appearing in sentences or even when being isolated characters. The currently proposed approaches have mainly used deep learning for automated feature extraction only. This is because these approaches are based on entire sentences or words, and it is difficult to collect a large training set for developing deep learning models.

The present disclosure proposes an approach to train the CNN model 202 with individual Arabic alphabets rather than words. As the Arabic alphabets are limited in number (i.e., 28 alphabets), the required training set can be collected from few paragraphs written by users. Hence, the present CNN based writer verification proposes an approach using hand-written alphabets and then use these trained models to provide writer verification based on handwritten words. This text-independent approach provides better accuracy than merely training a CNN classifier on whole words. This also requires lesser training data compared to known techniques, as multiple copies of the same alphabet are available per user written text. That said, the present disclosure can also provide writer verification by training the CNN model 202 on whole words as opposed to individual alphabets. This can be done in a text-dependent manner (where the model is trained and tested on the same set of words) and text-independent manner (where the model is trained on a different set of words than the words in the test set). In some examples, the model 200 is capable of identifying different writers in a given hand written notes provided in a single sheet based on analysis.

The first embodiment of the present disclosure is illustrated with respect to FIG. 1 in conjunction with FIGS. 2-5. The first embodiment describes the target user identification method 100. The target user identification method 100 comprises receiving, by the processing circuitry 601, the dataset 210, the dataset 210 including hand written Arabic words and hand written Arabic alphabets from one or more users; removing, by the processing circuitry 601, whitespace around alphabets in the hand written Arabic words and the hand written Arabic alphabets in the dataset 210; splitting, by the processing circuitry 601, the dataset 210 into the training set 402, the validation set 404, and the test set 406; classifying, by the processing circuitry 601, one or more user datasets from the training set 402, the validation set 404, and the test set 406; and identifying, by the processing circuitry 601, the target user from the one or more user datasets, the identification of the target user including the verification accuracy ($\beta$) of the hand written Arabic words being larger than the verification accuracy threshold value. The verification accuracy threshold of higher than 50% is generally considered acceptable but other thresholds such as 60%, 70%, or 80% may also be used. The threshold value is application dependent and some applications might want to set a higher threshold value to verify the authorship of the target user especially if the number of available alphabets in the recovered document is small. Verification accuracy ($\beta$) is calculated as described herein.

The method 100 further comprising removing one or more hand written Arabic alphabets in the target user dataset associated with the target user to form the reduced alphabets dataset 274, wherein the one or more hand written Arabic alphabets have the threshold value less than the performing threshold.

The method 100 further comprising classifying the target user dataset with the training set 402, the validation set 404, the test set 406, and the reduced alphabets dataset 274. Classifying, by the processing circuitry 601, the one or more user datasets includes one or more user classifiers. Each of the one or more user classifiers includes the target class and the rest class. The target class represents the class being associated with the target user and the rest class represents the class being associated with users excluding the target user.

The method 100 further comprising verifying the hand written Arabic words by dividing the first number of alphabets verified to be written by the target user in the hand written Arabic words by the total number of alphabets in the hand written Arabic words.

The second embodiment of the present disclosure is illustrated with respect to FIG. 6 in conjunction with FIGS.

2-5. The second embodiment describes the target user identification device. The target user identification device comprising the display panel 630 configured to display hand written Arabic words and hand written Arabic alphabets from one or more users; the memory 602 configured to store the hand written Arabic words and the hand written Arabic alphabets; and the processing circuitry 601 configured to receive the dataset 210, the dataset 210 including the hand written Arabic words and the hand written Arabic alphabets; remove whitespace around alphabets in the hand written Arabic words and the hand written Arabic alphabets in the dataset 210; split the dataset 210 into the training set 402, the validation set 404, and the test set 406; classify one or more user datasets from the training set 402, the validation set 404, and the test set 406; and identify the target user from the one or more user datasets, the identification of the target user including the verification accuracy ($\beta$) of the hand written Arabic words being larger than the verification accuracy threshold value.

The processing circuitry is further configured to remove one or more hand written Arabic alphabets in the target user dataset associated with the target user to form the reduced alphabets dataset 274, wherein the one or more hand written Arabic alphabets have the threshold value less than the performing threshold.

The processing circuitry is further configured to classify the target user dataset with the training set 402, the validation set 404, the test set 406, and the reduced alphabets dataset 274. Classifying, by the processing circuitry 601, the one or more user datasets includes one or more user classifiers. Each of the one or more user classifiers includes the target class and the rest class. The target class represents the class being associated with the target user and the rest class represents the class being associated with users excluding the target user.

The processing circuitry is further configured to verify the hand written Arabic words by dividing the first number of alphabets verified to be written by the target user in the hand written Arabic words by the total number of alphabets in the hand written Arabic words.

The third embodiment of the present disclosure is illustrated with respect to FIG. 6 in conjunction with FIGS. 2-5. The third embodiment describes the non-transitory computer-readable storage medium storing computer-readable instructions that, when executed by the computer, cause the computer to perform the method 100. The method 100 comprising receiving, by the processing circuitry 601, the dataset 210, the dataset 210 including hand written Arabic words and hand written Arabic alphabets from one or more users; removing, by the processing circuitry 601, whitespace around alphabets in the hand written Arabic words and the hand written Arabic alphabets in the dataset 210; splitting, by the processing circuitry 601, the dataset 210 into the training set 402, the validation set 404, and the test set 406; classifying, by the processing circuitry 601, one or more user datasets from the training set 402, the validation set 404, and the test set 406; and identifying, by the processing circuitry 601, the target user from the one or more user datasets, the identification of the target user including the verification accuracy ($\beta$) of the hand written Arabic words being larger than the verification accuracy threshold value.

The non-transitory computer-readable storage medium further comprising removing one or more hand written Arabic alphabets in the target user dataset associated with the target user to form the reduced alphabets dataset 274, wherein the one or more hand written Arabic alphabets have the threshold value less than the performing threshold.

The non-transitory computer-readable storage medium further comprising classifying the target user dataset with the training set 402, the validation set 404, the test set 406, and the reduced alphabets dataset 274. Classifying, by the processing circuitry 601, the one or more user datasets includes one or more user classifiers. Each of the one or more user classifiers includes the target class and the rest class. The target class represents the class being associated with the target user and the rest class represents the class being associated with users excluding the target user.

Figure 7:
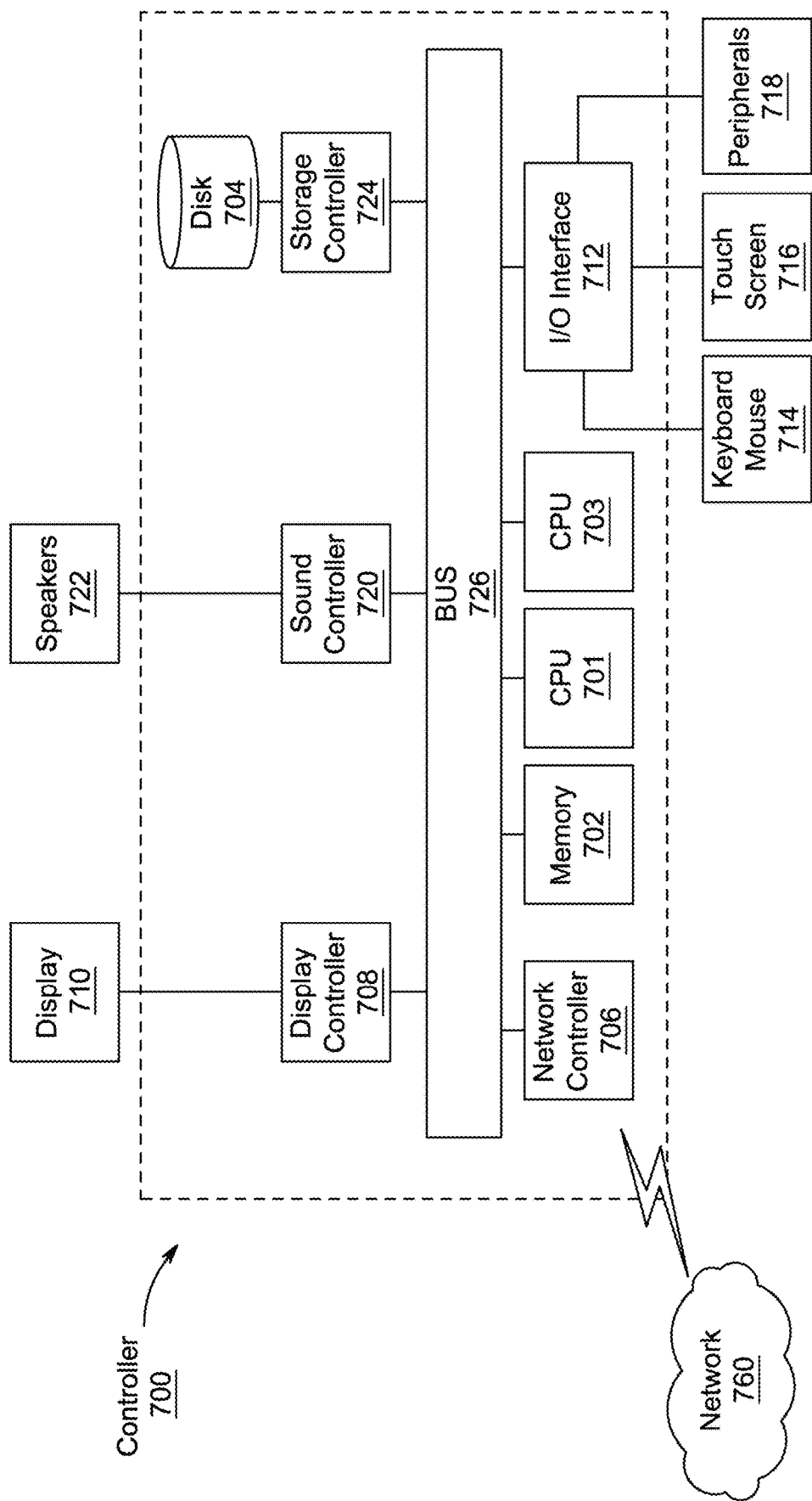
FIG. 7 is an illustration of a non-limiting example of details of computing hardware used in a processing circuitry of the target user identification device of FIG. 6, according to certain embodiments.

Next, details of the hardware description of the processing circuitry 601 of FIG. 6 according to exemplary embodiments is described with reference to FIG. 7. In FIG. 7, a controller 700 described is representative of the processing circuitry 601 of FIG. 6 in which the controller 700 is a computing device which includes a CPU 701 and optionally a CPU 703 which performs the processes described above/below. The process data and instructions may be stored in memory 702 (same as the memory 602 of FIG. 6). These processes and instructions may also be stored on a storage medium disk 704 such as a hard drive (HDD) or portable storage medium or may be stored remotely.

Example Implementation

In order to train a model on Arabic alphabets, a dataset of user written Arabic alphabets was collected. However, the Arabic alphabets writing style varies depending on whether the alphabet is written as isolated alphabets (not part of a word) or as part of a word. For example, Table 2 shows the variations between the same alphabets written by two different users in isolation and as part of the word (see FIG. 11).

It can be seen that there are substantial variations in the same alphabet written by the same user depending on whether it is written in isolation or as part of the word. Two possibilities for user written alphabet dataset collection are available:

1. Each user writes all possible variants of Arabic alphabets (isolated alphabets)
2. Each user writes certain Arabic words that cover the entire set of Arabic alphabets and then manually extract these Arabic alphabets from these words (extracted alphabets)

Both datasets were collected for comparative analysis, identified herein as:

1. Isolated Alphabets dataset (IAD)
2. Extracted Alphabets dataset (EAD)

The IAD dataset consists of Arabic alphabets written in isolation (not part of word), while the EAD dataset consists of the alphabets extracted from user inscribed words.

Isolated Alphabets Dataset (IAD)—In the Arabic language, words use different forms of the same alphabet depending on whether the alphabet occurred at the beginning, middle, end, or in isolation (regular) as shown in FIG. 14—Table 1. All different variants were collected, including (begin, middle, end and regular) of each alphabet. Further, Arabic alphabets can be classified into different groups depending on their similarity in writing style as shown in FIG. 14—Table 1. In this dataset, only one alphabet from each group of a similarly styled alphabet was collected. Thus, the dataset consisted of 65 different variants of Arabic alphabets within 19 groups.

The data was collected from twenty different students in the same classroom. Each student wrote each alphabet variant ten times. This resulted in a dataset of 13,000 alphabets from different users. Table 3 shows samples collected from three different users (see FIG. 12). It can be observed that there are differences in pen color, stroke widths and writing styles of these alphabets across different users. In real world applications, users can use any available writing instruments such as ballpoint, roller, fountain, gel pens or pencils. Therefore, the users were not restricted on the writing instrument used to collect this dataset.

Extracted Alphabets Dataset (EAD)—The extracted alphabets dataset consisted of alphabets cropped from user written words. The users were asked to write ten Arabic words for ten times. The set of words were selected such that they covered the entire set of Arabic alphabets. FIG. 1 shows the sample of user written words. The alphabets were extracted from these words manually, and a sample of extracted words is shown in FIG. 2. Thus, the dataset consisted of at least ten samples of each alphabet, and the complete dataset consists of 10,780 extracted alphabets.

In order to implement user verification, the problem was posed as a one vs. rest (OVR) classifier. Twenty (20) binary classifiers were developed, one per user. Each user would then be verified by using its own model. The dataset was therefore divided into 20 different datasets where each dataset represented a single classifier's training, validation, and test sets (with a 60-20-20 ratio) with two classes:
 1. target class (representing the target user of this classifier)
 2. rest class (represented the rest of the users)

Thus, the target class had 18 times fewer instances than the rest class. In order to balance the dataset, the target class data within each classifier was augmented 18 times. The data was augmented with a 5 percent random shift (left, right, up and down) along with 10-degree random rotation.

The CNN classifier was prepared using hyper-parameter tuning to improve the validation accuracy. The trained models were then tested using each user's test set to determine test accuracy. The experiments were conducted on GPU machine having 32 Gigabyte of memory, Nvidia GeForce GTX-1080 GPU with 2560 CUDA cores and 3.70 GHz CPU with 6 cores. All the experiments were performed using the Python programming language with TensorFlow libraries.

Figure 10A:
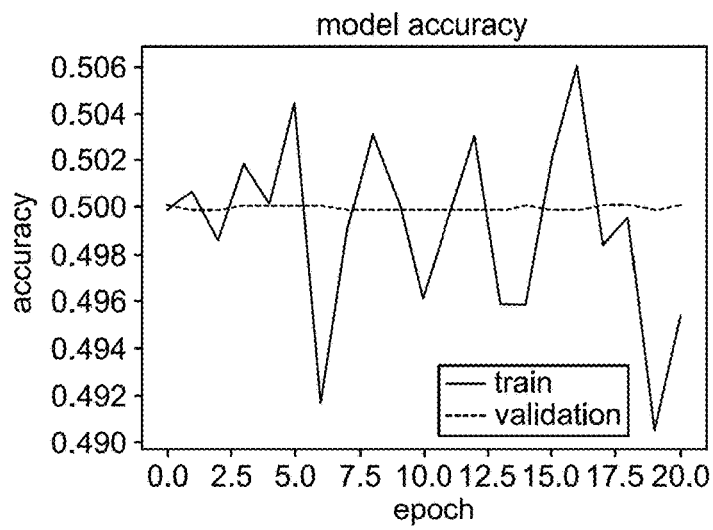
FIG. 10A-C. Model accuracy with under-fit model (A), over-fit model (B) and optimized model (C)
Figure 10B:
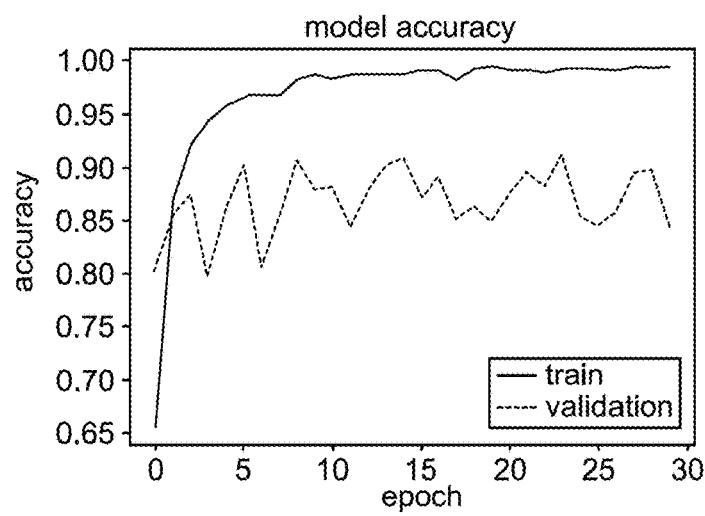
Figure 10C:
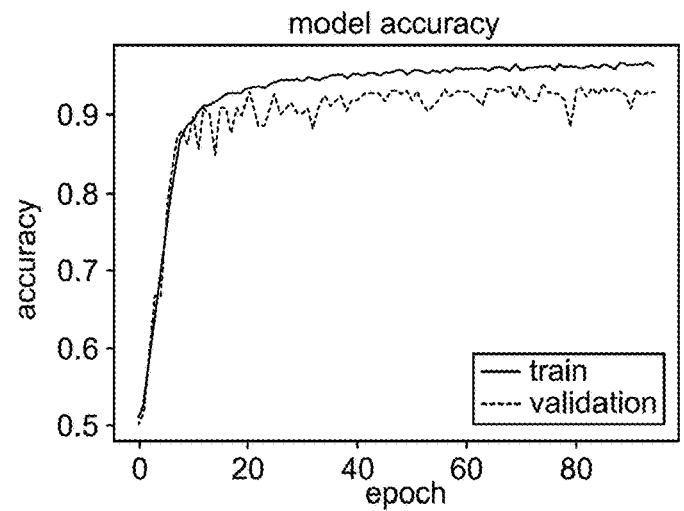

An initial analysis was conducted using the IAD dataset to determine the efficacy of CNN based approach to identify a user based on their handwritten isolated alphabets. A CNN model with a single convolution and neural network layer was used first. FIG. 10A shows the model accuracy with this configuration. It can be seen that model is not able to learn well from the data and both training and validation accuracies are quite low (about 50%). Convolution layers were added incrementally and neural network layers with increased filter sizes until overfitting occurred FIG. 10B shows the model with over-fitting. The dropout layers were then added to reduce overfitting resulting a better configuration with model accuracies shown in FIG. 10C.

The optimized CNN model used for training purpose is shown in Table 4. The model takes as input 64×64 images and applies a convolutional layer with 128 filters (filter size 3×3). This is followed by a ELU activation layer to provide non-linearity and max pooling layer to extract prominent features and also reduce the features space. This was followed by three similar convolutional and max pooling layers. A dropout layer (probability=0.5) was added after each max pooling layer to reduce overfitting. The output of convolutional layers was 256 features that were then processed by a neural network hidden layer of 128 neurons followed by the output layer.

TABLE 2

The optimized CNN model used for training

| Layer | Network Layer | Output Shape | Parameters |
|---|---|---|---|
| 1 | Convolution 1 | (62, 62, 128) | 1280 |
| 2 | Max Pooling 1 | (31, 31, 128) | 0 |
| 3 | Dropout 1 | (31, 31, 128) | 0 |
| 4 | Convolution 2 | (29, 29, 64) | 73792 |
| 5 | Max Pooling 2 | (14, 14, 64) | 0 |
| 6 | Dropout 2 | (14, 14, 64) | 0 |
| 7 | Convolution 3 | (12, 12, 64) | 36928 |
| 8 | Max Pooling 3 | (6, 6, 64) | 0 |
| 9 | Dropout 3 | (6, 6, 64) | 0 |
| 10 | Convolution 4 | (4, 4, 64) | 36928 |
| 11 | Max Pooling 4 | (2, 2, 64) | 0 |
| 12 | Flatten Layer | (256) | 0 |
| 13 | Dense Layer 1 | (128) | 32896 |
| 14 | Dropout 4 | (128) | 0 |
| 15 | Dense Layer 2 | (1) | 29 |
| | Total parameters: | | 181,953 |

Table 5 shows the training, validation and test results for twenty OVR models based on the LAD dataset. The color-coding scheme is used to clearly highlight the minimum, maximum and variation in the results. The model accuracy is represented as $\Omega$. Therefore, $\Omega_{iad\_training}$ column shows the training accuracy and $\Omega_{iad\_validation}$ shows the validation accuracy during model training. It can be seen that average validation accuracy is 94% and the difference between training and validation accuracies is small. This indicates that the model has learnt quite well from the dataset.

TABLE 3

Model accuracies using IAD dataset

| | Model training | | Test_iad_all | | | test_iad_reduced |
|---|---|---|---|---|---|---|
| userid | $\Omega_{iad\_training}$ | $\Omega_{iad\_validation}$ | $\Omega_{iad\_test}$ | $\rho_{iad\_test}$ | $\Upsilon_{iad\_test}$ | $\Omega_{iad\_reduced\_test}$ |
| user01 | 0.96 | 0.939 | 0.921 | 0.922 | 0.919 | 0.934 |
| user02 | 0.999 | 0.999 | 0.998 | 0.997 | 1 | 0.999 |
| user03 | 0.985 | 0.977 | 0.957 | 0.966 | 0.946 | 0.985 |
| user04 | 0.967 | 0.94 | 0.935 | 0.916 | 0.957 | 0.948 |
| user05 | 0.974 | 0.941 | 0.92 | 0.911 | 0.932 | 0.933 |
| user06 | 0.952 | 0.903 | 0.889 | 0.953 | 0.818 | 0.899 |
| user07 | 0.963 | 0.934 | 0.915 | 0.897 | 0.938 | 0.925 |
| user08 | 0.973 | 0.825 | 0.911 | 0.911 | 0.912 | 0.931 |
| user09 | 0.973 | 0.944 | 0.885 | 0.917 | 0.846 | 0.898 |
| user10 | 0.961 | 0.933 | 0.907 | 0.9 | 0.916 | 0.916 |
| user11 | 0.973 | 0.964 | 0.953 | 0.969 | 0.936 | 0.957 |
| user12 | 0.955 | 0.932 | 0.917 | 0.923 | 0.911 | 0.931 |
| user13 | 0.974 | 0.957 | 0.927 | 0.945 | 0.907 | 0.958 |

TABLE 3-continued

Model accuracies using IAD dataset

| userid | | | | | |
|---|---|---|---|---|---|
| user14 | 0.975 | 0.959 | 0.935 | 0.929 | 0.941 | 0.949 |
| user15 | 0.963 | 0.936 | 0.901 | 0.911 | 0.889 | 0.942 |
| user16 | 0.974 | 0.962 | 0.937 | 0.973 | 0.898 | 0.947 |
| user17 | 0.97 | 0.94 | 0.939 | 0.928 | 0.952 | 0.944 |
| user18 | 0.959 | 0.915 | 0.888 | 0.874 | 0.906 | 0.903 |
| user19 | 0.958 | 0.935 | 0.912 | 0.948 | 0.872 | 0.925 |
| user20 | 0.96 | 0.924 | 0.889 | 0.917 | 0.856 | 0.92 |
| Avg. | 0.97 | 0.94 | 0.92 | 0.93 | 0.91 | 0.94 |

| | test_iad_reduced | | Test_ead | | |
|---|---|---|---|---|---|
| userid | $\rho_{iad\_reduced\_set}$ | $Y_{iad\_reduced\_test}$ | $\Omega_{ead\_test}$ | $\rho_{ead\_test}$ | $Y_{ead\_test}$ |
| user01 | 0.928 | 0.942 | 0.632 | 0.592 | 0.827 |
| user02 | 0.999 | 0.999 | 0.991 | 0.989 | 0.991 |
| user03 | 0.977 | 0.994 | 0.948 | 0.935 | 0.963 |
| user04 | 0.928 | 0.971 | 0.665 | 0.599 | 0.98 |
| user05 | 0.914 | 0.956 | 0.75 | 0.87 | 0.582 |
| user06 | 0.956 | 0.838 | 0.67 | 0.657 | 0.726 |
| user07 | 0.91 | 0.944 | 0.757 | 0.708 | 0.882 |
| user08 | 0.919 | 0.945 | 0.691 | 0.658 | 0.809 |
| user09 | 0.93 | 0.861 | 0.615 | 0.644 | 0.532 |
| user10 | 0.903 | 0.931 | 0.718 | 0.837 | 0.548 |
| user11 | 0.972 | 0.942 | 0.678 | 0.767 | 0.485 |
| user12 | 0.934 | 0.927 | 0.673 | 0.632 | 0.796 |
| user13 | 0.957 | 0.959 | 0.657 | 0.712 | 0.529 |
| user14 | 0.938 | 0.962 | 0.599 | 0.575 | 0.762 |
| user15 | 0.921 | 0.967 | 0.784 | 0.828 | 0.717 |
| user16 | 0.981 | 0.912 | 0.684 | 0.647 | 0.839 |
| user17 | 0.932 | 0.958 | 0.593 | 0.567 | 0.79 |
| user18 | 0.877 | 0.939 | 0.674 | 0.751 | 0.521 |
| user19 | 0.952 | 0.895 | 0.682 | 0.655 | 0.767 |
| user20 | 0.931 | 0.908 | 0.569 | 0.56 | 0.687 |
| Avg. | 0.94 | 0.94 | 0.70 | 0.71 | 0.74 |

The trained models were tested on the IAD test set. We represent recall of ith model as $Y_i=\tau/(\tau+\xi)$, $\tau$ is the total number of correct target class predictions and $\xi$ is the total errors made to verify the target class. So, in essence, Y shows the verification accuracy of the target user (i.e. ratio of correct target class verification out of the target user written alphabets). Henceforth, the term Y is used as target user verification accuracy. The $i_{th}$ model precision with $\rho_i=\tau/(\tau+F)$, where F is the total errors made by the model to incorrectly identify the other users as the target user. Thus, $\rho$ shows the ratio of correct target class verification out of all the target class predictions made by the model.

The column "test_iad_all" in Table 5 shows the test accuracy ($\Omega_{iad\_test}$), precision ($\rho$) and target user verification accuracy ($Y_{iad\_test}$) for testing the model against all alphabets in the IAD test set. As our dataset is balanced, there is not much difference in $\Omega$, $\rho$ and Y values. Main concern is with the target user verification accuracy (Y). The average $Y_{iad\_test}$ is 91%, which indicates that the trained model works reasonably well on previously unseen isolated alphabets to verify the target user. Some users had a low $Y_{iad\_test}$ values (e.g. user006 has 82%) while a few others had a very high value of $Y_{iad\_test}$ (e.g. 100% for user002). The very high validation and test accuracy attained by user002 can be attributed to the instrument type used by that user that differentiated it from all other users. To illustrate this, we are showing samples of "kaf_regular" alphabet written by all users in Table 6 (see FIG. 13). It can be observed that there are clear distinguishable features present in writing style of this alphabet across all users. It can also be seen that user002 instrument type makes the user further distinguishable from the rest.

Figure 15:
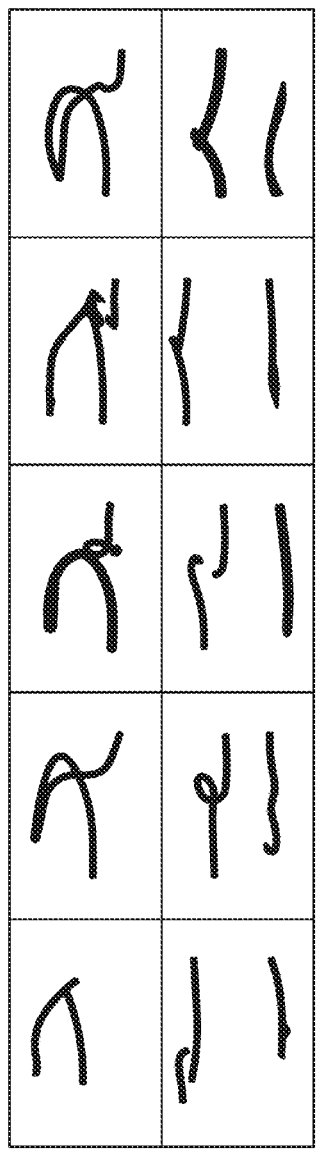
FIG. 15 shows a table (Table 7) of variations in extracted ain_middle (top) and yaa_middle (bottom) alphabets written by user005.

The ratio of verification errors made per alphabet by each target user model was collected. The ratio of verification error made by $i_{th}$ target user model against $k^{th}$ alphabet as $\delta_{ik}$ such that $Y_i=1-\tau_k\delta_{ik}$. FIG. 15—Table 7 shows the average error ($\lambda_k$) across all users for each alphabet for the IAD dataset where $\lambda_k=(\Sigma_i\delta_{ik})/n$ where n is the total number of users. It can be seen that most of the alphabets got less than 10% error, but some alphabets (e.g. alif_regular, lam_regular, etc.) had high errors. For example, alif_regular had a 40% average error. It can be attributed to the writing style of these alphabets, as alif_regular is written like a straight line and there would be quite less distinction in its writing style across users. On the other hand, kaf_regular had less than 2% average error. As shown in Table 6 the writing style of this alphabet distinctly varies across users.

The average errors ($\lambda_k$) shown in FIG. 15—Table 7 do not provide enough details on whether the errors were made by a single user as an outlier or spread across a large set of users. In order to understand the distributions of errors, the individual error values ($\delta_{ik}$) of two best are shown, average and worst performing alphabets using heat map in Table 8. It can be seen that the best performing alphabets (kaf_regular and feh_begin) perform well across all users. The worst performing alphabets (alif_regular and alif_hamza) perform worse across majority of the users. However, for user002, even the worst performing alphabets (alif_regular and alif_hamza) had zero error. As highlighted earlier, this can be attributed to instrument type used by the user.

TABLE 4

Average error ($\lambda_k$) of isolated alphabets across all users for IAD dataset

| | | | | | | | |
|---|---|---|---|---|---|---|---|
| kaf_regular | 0.018 | seen_end | 0.053 | waw_end | 0.077 | sad_middle | 0.108 |
| feh_begin | 0.029 | beh_begin | 0.054 | raa_end | 0.08 | beh_regular | 0.109 |
| noon_end | 0.032 | beh_middle | 0.057 | meem_end | 0.082 | lam_begin | 0.111 |
| yaa_middle | 0.033 | seen_middle | 0.057 | jeem_regular | 0.084 | yaa_regular | 0.114 |
| heh_middle | 0.035 | sad_end | 0.057 | meem_regular | 0.084 | alif_end | 0.121 |
| qaf_middle | 0.037 | tah_regular | 0.057 | heh_end | 0.084 | waw_regular | 0.121 |
| jeem_middle | 0.045 | sad_regular | 0.058 | lam_middle | 0.085 | kaf_begin | 0.125 |
| seen_regular | 0.045 | jeem_begin | 0.059 | sad_begin | 0.087 | seen_begin | 0.128 |
| feh_middle | 0.045 | qaf_regular | 0.061 | kaf_middle | 0.087 | heh_regular | 0.149 |
| beh_end | 0.049 | ain_begin | 0.062 | meem_begin | 0.091 | dal_regular | 0.152 |
| tah_middle | 0.049 | ain_regular | 0.062 | heh_begin | 0.091 | raa_regular | 0.188 |
| feh_end | 0.05 | noon_middle | 0.062 | noon_regular | 0.096 | lam_regular | 0.213 |
| qaf_end | 0.05 | yaa_begin | 0.063 | feh_regular | 0.097 | alif_hamza | 0.362 |
| yaa_end | 0.05 | lam_alif | 0.063 | meem_middle | 0.097 | alif_regular | 0.39 |
| tah_end | 0.051 | lam_end | 0.067 | ain_middle | 0.1 | | |
| kaf_end | 0.051 | noon_begin | 0.072 | jeem_end | 0.104 | | |
| qaf_begin | 0.052 | dal_end | 0.074 | ain_end | 0.107 | | |

TABLE 5

Error ratio of best, average and worst performing alphabets across all users for IAD dataset (darker color indicates higher error).

| userid | kaf_regular | feh_begin | qaf_end | yaa_end | alif_regular | alif_hamza |
|---|---|---|---|---|---|---|
| user001 | 0.053 | 0.079 | 0 | 0.105 | 0.553 | 0.447 |
| user002 | 0 | 0 | 0 | 0 | 0 | 0 |
| user003 | 0 | 0 | 0 | 0 | 0.595 | 0.816 |
| user004 | 0 | 0 | 0 | 0.289 | 0 | 0.132 |
| user005 | 0 | 0.026 | 0.132 | 0 | 0.447 | 0.342 |
| user006 | 0.026 | 0.053 | 0.053 | 0.132 | 0.711 | 0.184 |
| user007 | 0 | 0 | 0.026 | 0.026 | 0.026 | 0.605 |
| user008 | 0 | 0 | 0.158 | 0.026 | 0.553 | 0.5 |
| user009 | 0 | 0 | 0.184 | 0.026 | 0.026 | 0.526 |
| user010 | 0 | 0.053 | 0.132 | 0 | 0.447 | 0.158 |
| user011 | 0.026 | 0.026 | 0 | 0.026 | 0.079 | 0.553 |
| user012 | 0.053 | 0.053 | 0.053 | 0.053 | 0.289 | 0.132 |
| user013 | 0 | 0.079 | 0 | 0.105 | 0.421 | 0.605 |
| user014 | 0.026 | 0 | 0.026 | 0 | 0.5 | 0.447 |
| user015 | 0 | 0 | 0.026 | 0 | 0.947 | 0 |
| user016 | 0.053 | 0.053 | 0.026 | 0.026 | 0.526 | 0.026 |
| user017 | 0.053 | 0 | 0.053 | 0 | 0.053 | 0.474 |
| user018 | 0 | 0.053 | 0 | 0 | 0.5 | 0.316 |
| user019 | 0.079 | 0.079 | 0.079 | 0.053 | 0.763 | 0.526 |
| user020 | 0 | 0.026 | 0.053 | 0.132 | 0.368 | 0.447 |

Based on the above analysis, some alphabets have more distinguishing features while others have lesser distinguishing features for writer identification. Hence, it is better to ignore the worst performing alphabets for writer identification. The model was evaluated by eliminating the 25% worst performing alphabets (highlighted with bold font in FIG. 15—Table 7). The results of $\Omega_{iad\_reduced\_test}$ and $Y_{iad\_reduced\_test}$ are shown in the "test_ad_reduced" column in Table 5. It can be seen that the performance has improved for each user model with the reduced set of alphabets. The average model performance improved to 93.75% from 91.25%.

The model trained on the IAD dataset performed quite well on the test set of isolated alphabets. However, in practice, we need to verify the writer based on words rather than just the isolated alphabets. Therefore, we evaluated model performance on alphabets extracted from user written words by testing it against the test set of the EAD dataset. The column "test_ead" in Table 5 shows the $\Omega_{ead\_test}$ and $Y_{ead\_test}$ values for the EAD test set. The average $Y_{ead\_test}$ was a meager 74% and six out of twenty users had $Ye_{ad\_test}$ values close to 50%. This means that model trained on the IAD dataset does not perform well on alphabets extracted from the words. As anticipated, the isolated alphabets are quite different from extracted alphabets and therefore cannot be used as a reliable model to predict user written words.

As shown in the previous experiments, the models trained on isolated alphabets cannot be used to reliably identify user written words (i.e. alphabets extracted from words). Therefore, a CNN based OVR model that was trained using the EAD dataset was evaluated. The obtained results are shown in FIG. 16—Table 9. The average training and validation accuracies ($\Omega_{ead\_training}$ and $\Omega_{ead\_validation}$) of these models was 97.5% and 92% respectively. This shows that the models learned well on training data. Test accuracy ($\Omega_{ead\_test}$) was also quite close to validation accuracy (89.2%). However, target user verification accuracy ($Y_{ead\_test}$) was close to 85% which is lower than the target user verification accuracy of isolated alphabets ($Y_{iad\_all}$=91.3%). This can be attributed to the presence of large variations within the extracted alphabets for the same user. In contrast, the isolated alphabets of the same user did not have such a large variation. When users are writing words in a flow, the shape of same alphabet changes across words. The shape of alphabet also varies depending upon how the writer joins it with the neighboring alphabets. To illustrate these variations in the alphabets written by the same user, samples of two different alphabets (ain_middle and yaa_middle) written by user005 are shown in FIG. 17—Table 10. It can be noticed that some user verification models did not perform well, for example user006 had target user verification accuracy of only 52.9%. On closer inspection, it was found that the model performed really bad with more than 80% error on few alphabets (jeem_middle, feh_middle, ain_middle, noon_end, alif_hamza, lam_alif). For example, the average error on alphabet "jeem_middle" from other user models was 13.1%, but the user006 model had an error of 94.7% . . . . Similarly, alphabet "ain_middle" had 97.4% error for user006 model while average error for other users is only 12%. This large error is due to the resemblance of these alphabets with other users' alphabets.

TABLE 6

Model accuracies using EAD dataset.

| userid | model training | | test_ead_all | | test_ead_reduced | |
|---|---|---|---|---|---|---|
| | $\Omega_{ead\_training}$ | $\Omega_{ead\_validation}$ | $\Omega_{ead\_test}$ | $\Upsilon_{ead\_test}$ | $\Omega_{ead\_reduced\_test}$ | $\Upsilon_{ead\_reduced\_test}$ |
| user001 | 0.974 | 0.9 | 0.888 | 0.845 | 0.895 | 0.854 |
| user002 | 0.998 | 0.995 | 0.987 | 0.986 | 0.984 | 0.981 |
| user003 | 0.992 | 0.983 | 0.979 | 0.998 | 0.984 | 1 |
| user004 | 0.97 | 0.913 | 0.893 | 0.925 | 0.909 | 0.948 |
| user005 | 0.976 | 0.931 | 0.878 | 0.857 | 0.902 | 0.89 |
| user006 | 0.947 | 0.804 | 0.72 | 0.529 | 0.728 | 0.544 |
| user007 | 0.977 | 0.959 | 0.924 | 0.921 | 0.931 | 0.935 |
| user008 | 0.961 | 0.91 | 0.847 | 0.825 | 0.882 | 0.876 |
| user009 | 0.961 | 0.879 | 0.866 | 0.843 | 0.883 | 0.864 |
| user010 | 0.966 | 0.875 | 0.848 | 0.775 | 0.881 | 0.839 |
| user011 | 0.988 | 0.976 | 0.973 | 0.971 | 0.976 | 0.977 |
| user012 | 0.973 | 0.892 | 0.858 | 0.801 | 0.873 | 0.827 |
| user013 | 0.969 | 0.912 | 0.886 | 0.865 | 0.903 | 0.898 |
| user014 | 0.992 | 0.976 | 0.945 | 0.938 | 0.944 | 0.926 |
| user015 | 0.981 | 0.938 | 0.933 | 0.933 | 0.941 | 0.943 |
| user016 | 0.98 | 0.952 | 0.932 | 0.902 | 0.956 | 0.943 |
| user017 | 0.972 | 0.904 | 0.833 | 0.714 | 0.846 | 0.736 |
| user018 | 0.969 | 0.912 | 0.916 | 0.895 | 0.931 | 0.926 |
| user019 | 0.972 | 0.899 | 0.862 | 0.758 | 0.876 | 0.787 |
| user020 | 0.976 | 0.876 | 0.869 | 0.787 | 0.863 | 0.775 |
| Average | 0.97 | 0.92 | 0.89 | 0.85 | 0.90 | 0.87 |

The writer verification using isolated alphabets technique was used to identify the performance of individual alphabets. The average alphabet errors ($\lambda k$) are shown in Table 11 and the worst performing alphabets with average error larger than 17% are highlighted in bold font. We reevaluated the model using the reduced set of alphabets (i.e. alphabets which are not highlighted with bold font in Table 11). The results of $\Omega$ead_reduced_test and Yead_reduced_test are shown in the "test_ead_reduced" column in FIG. 16—Table 9. It can be seen that the performance has improved for each user model with the reduced set of alphabets. The average model performance improved to 87.3% from 85.3%.

TABLE 8

Average error ($\lambda_k$) of extracted alphabets across all users for EAD dataset.

| | | | | | |
|---|---|---|---|---|---|
| lam_begin | 0.045 | sad_begin | 0.097 | feh_middle | 0.16 | haa_middle | 0.174 |
| khah_middle | 0.047 | feh_begin | 0.111 | zay_end | 0.161 | teh_middle | 0.176 |
| qaf_begin | 0.053 | theh_regular | 0.124 | alif_regular | 0.162 | lam_middle | 0.18 |
| lam_alif | 0.068 | noon_regular | 0.134 | ghain_begin | 0.162 | yaa_begin | 0.181 |
| dad_middle | 0.071 | sheen_begin | 0.14 | ain_middle | 0.163 | raa_end | 0.196 |
| tah_middle | 0.073 | heh_middle | 0.141 | thal_regular | 0.168 | meem_middle | 0.256 |
| sheen_middle | 0.079 | teh_closed | 0.141 | dal_end | 0.171 | heh_regular | 0.256 |
| kaf_middle | 0.082 | meem_begin | 0.15 | meem_end | 0.171 | alif_hamza | 0.265 |
| thah_end | 0.096 | lam_regular | 0.158 | seen_middle | 0.172 | noon_end | 0.272 |
| beh_begin | 0.097 | yaa_middle | 0.159 | jeem_middle | 0.173 | | |

The isolated alphabets model was used to evaluate the performance of individual words (i.e. wm_iad approach). Each alphabet extracted from the word written by userj was checked using the IAD model (F (user$_j$) (ai)) and the writer verification accuracy of each word (β) is shown in Table 12. For example, the word (فـيكهم) written by user001 has accuracy of 0.67 because 6 out of 9 alphabets in the word were verified by IAD model to be written by user001. As β=0.67≥0.5, therefore the word is verified to be written by user001. The user001 verification accuracy for all the words is 100%. It can also be seen that several user written word were incorrectly verified. The average target user verification accuracy for the wm_iad approach was 85%. This is better than the average target user verification for the individual alphabets (74%), as it is more likely that at least half of alphabets of the word will be correctly verified.

Then the extracted alphabets models were used to evaluate the performance of individual words (i.e. wm_ead approach). Each alphabet extracted from the word written by userj was checked using the EAD model (F (userj) (ai)) and the writer verification accuracy of each word (β) is shown in Table 13. The word is verified to be written by the target user if β≥0.5. The values with β<0.5 are shown. It can be seen that majority of the users were verified with 100% accuracy and only a few words from user005 and user006 were not correctly verified. The average target user verification accuracy for wm_ea approach was 98%. This clearly shows that the extracted alphabets based approach provides the best results for text-independent user verification, and is recommended for use in practical implementations.

Then experiments to identify target user verification accuracy using whole word based models were conducted. In the first experiment, text-independent approach (wm_ind) was used and the model was trained and validated on 80% of the words in the dataset (with 80% training and 20% validation). The remaining 20% of the words (which were never seen by the model during training) were used to test the model. The target class in the OVR dataset was augmented 18 times to keep the data balanced. The data was augmented with a 5 percent random shift (left, right, up and down) along with 10-degree random rotation.

Table 14 shows the target user verification accuracies of all the models. The $Y_{wm\_ind}$ column shows the target user verification accuracy using text independent whole word model. It can be seen that it performs much worse than $Y_{win\_ead}$ approach and the average accuracy is 77%. In general, the text-independent model based on whole words does not perform well in testing because the words tested are different from the words used for training and validation. It can be observed that for most of the users, $Y_{wm\_iad}$ is better than $Y_{wm\_ind}$ which means that capturing user written isolated alphabets and using them to verify the user written words is better than verifying based on a model trained on previously unseen words.

TABLE 11

Target user verification accuracies for each word model

| userid | text-independent | | text-dependent | |
|---|---|---|---|---|
| | $Y_{wm\_iad}$ | $Y_{wm\_ead}$ | $Y_{wm\_ind}$ | $Y_{wm\_dep}$ |
| user001 | 1 | 1 | 0.47 | 0.95 |
| user002 | 1 | 1 | 1 | 1 |
| user003 | 1 | 1 | 0.81 | 1 |
| user004 | 1 | 1 | 0.5 | 0.98 |
| user005 | 0.6 | 0.9 | 0.93 | 0.95 |

TABLE 11-continued

Target user verification accuracies for each word model

| userid | text-independent | | text-dependent | |
|---|---|---|---|---|
| | $Y_{wm\_iad}$ | $Y_{wm\_ead}$ | $Y_{wm\_ind}$ | $Y_{wm\_dep}$ |
| user006 | 0.9 | 0.7 | 0.75 | 0.91 |
| user007 | 1 | 1 | 0.83 | 0.9 |
| user008 | 0.9 | 1 | 0.76 | 0.92 |
| user009 | 0.5 | 1 | 0.53 | 0.99 |
| user010 | 0.6 | 1 | 0.74 | 0.92 |
| user011 | 0.4 | 1 | 0.8 | 0.83 |
| user012 | 1 | 1 | 0.52 | 0.95 |
| user013 | 0.6 | 1 | 0.63 | 0.91 |
| user014 | 1 | 1 | 0.94 | 0.93 |
| user015 | 1 | 1 | 0.83 | 0.87 |
| user016 | 1 | 1 | 0.71 | 0.99 |
| user017 | 1 | 1 | 0.9 | 0.97 |
| user018 | 0.6 | 1 | 0.96 | 0.92 |
| user019 | 1 | 1 | 0.86 | 0.72 |
| user020 | 0.9 | 1 | 0.84 | 0.9 |
| Average | 0.85 | 0.98 | 0.77 | 0.93 |

Then experiments for text-dependent whole words based approach (wm_dep) were conducted. In this case, training, validation and testing was performed on the same set of words. For each word, 60% samples were used during training, 20% for validation and the remaining 20% for testing. The target class in OVR dataset was augmented to keep the dataset balanced. $Y_{wm\_dep\ column}$ in Table 14 shows the text dependent writer verification accuracy based on whole word. The text-dependent model performs quite well. The average target user verification accuracy ($Y_{wmt\_test}$) is 93%, which is better than target user verification accuracy of isolated and extracted alphabet models shown in Table 5 and FIG. 16—Table 9 (91% and 85% respectively). This is because whole word has more distinguishing features than a single alphabet. However, the applicability of text-dependent approach is quite limited. As mentioned earlier, a text-dependent approach is difficult to scale as it would require each user to write all possible Arabic words and can only be used in certain domains where the list of potential words to identify the writer has been shortened to a selected few words.

Table 14 provides a comparison of the writer verification using words based models. The first three models are for text-independent user verification and it can be seen that the whole word based model performs quite worse and has only 76% accuracy. The model trained on extracted alphabets performs the best with 98% accuracy. It also shows that the isolated alphabets based approach works better than the text-independent word-based approach to verify the target user. For text-dependent writer verification, word based model is quite good and provides 92.5% accuracy.

The present disclosure provides an alphabet based approach for text-independent offline writer verification of Arabic text. Writer verification models based on isolated and extracted alphabets can be developed using CNN and used to verify the writer of handwritten Arabic words with high accuracy (e.g., 98%). Verification based on individual isolated alphabets can be improved from 91% to 94% by eliminating the alphabets which do not provide any useful information to verify the writer. The present disclosure provides a similar writer verification approach based on the alphabets extracted from user-written words. The writer verification accuracy based on extracted alphabets improves from 85% to 87% on a reduced set of alphabets. The model performance on extracted alphabets can be lower than on isolated alphabets because of inconsistencies in user writing of alphabets as part of a word (depending on where the alphabet occurs in the word). However, models trained on extracted alphabets can perform better (98%) than the model trained on isolated alphabets (85%) for writer verification of user written words. This is because, for example, the alphabets extracted from words are less likely to match the isolated alphabet from the same user. The approach of the present disclosure makes it possible to automatically extract features and obtain a high accuracy (98%) using CNN even with a small set of user written words (in this case 100 words per user). This approach provides better accuracy than training CNN on whole words resulting in 77% accuracy for text-independent and 93% accuracy for text-dependent writer verification. The approach of the present disclosure is thus suitable for scenarios where automatic feature extraction and classification using CNN is desired in the absence of a large amount of user written text.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA Geforce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710 (same as the display panel 630 of FIG. 6), keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
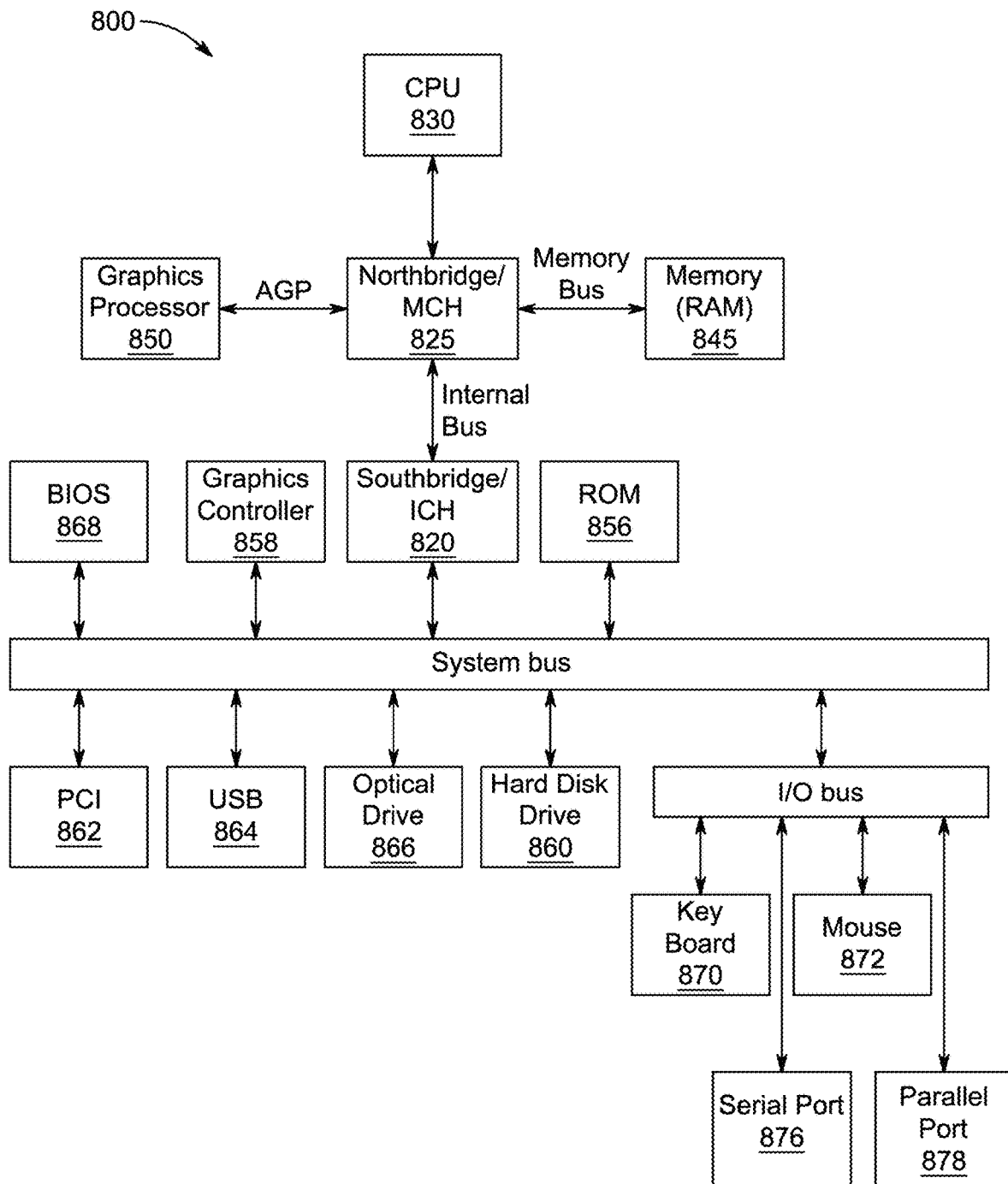
FIG. 8 is an exemplary schematic diagram of a data processing system used within the processing circuitry, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
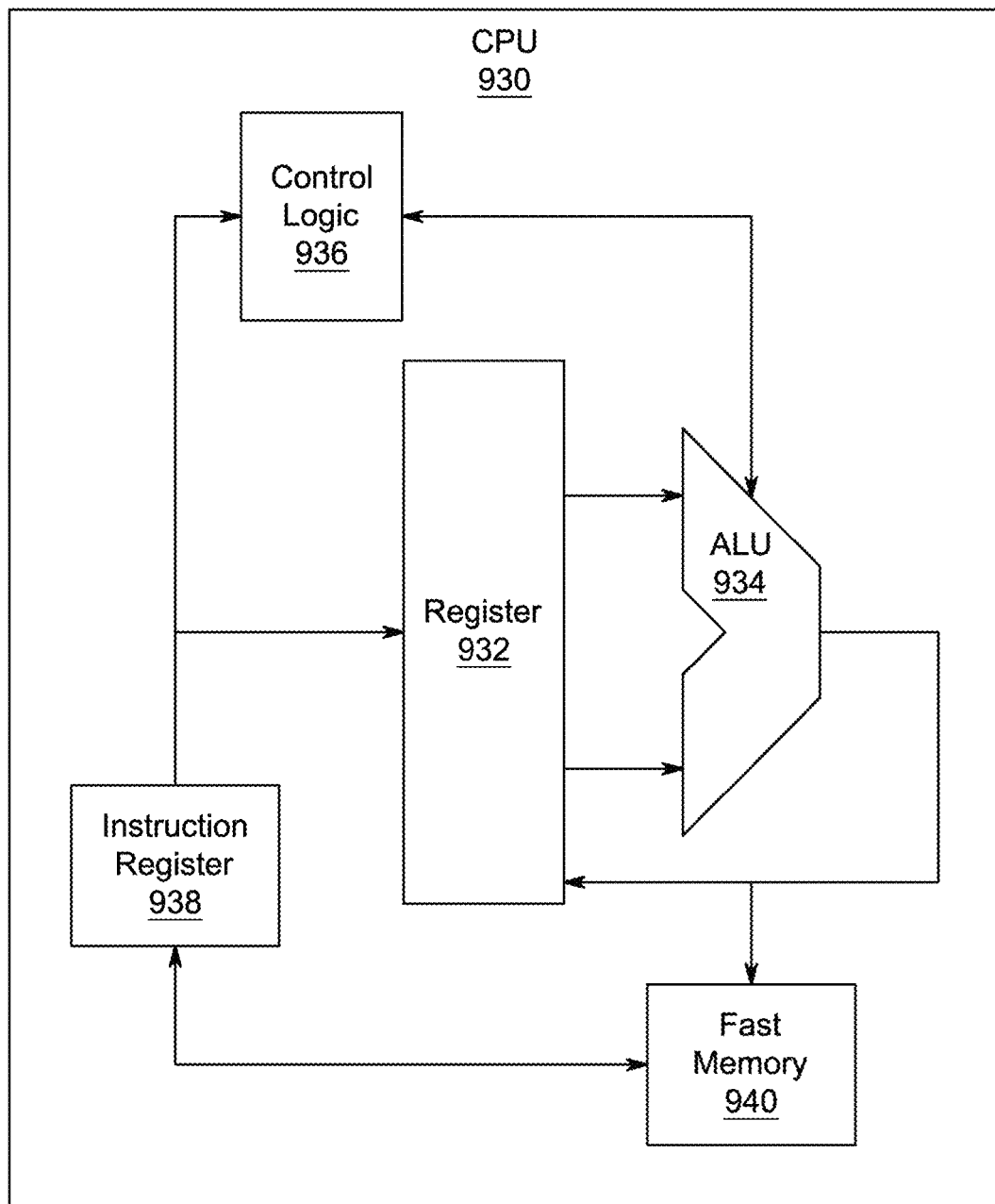
FIG. 9 is an exemplary schematic diagram of a processor used with the processing circuitry, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 10, UNIX, Solaris, LINUX, Apple MAC-OS and other systems known to those skilled in the art.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A text independent writer verification device, comprising:
   a display panel configured to display hand written cursively connected Arabic words and individual hand written Arabic alphabets written by one or more target users;
   a memory configured to store the hand written cursively connected Arabic words and the individual hand written Arabic alphabets;
   an input device in the form of a digital pen to receive the hand written Arabic alphabets written by the one or more target users and communicatively connected to processing circuitry, and
   wherein the processing circuitry is configured to:
   receive a dataset, the dataset including a set of hand written cursively connected Arabic words, the set of hand written cursively connected Arabic words including a minimum set of words that encompass the entire set of Arabic alphabets;
   extract individual alphabets from each of the set of hand written cursively connected Arabic words to form extracted individual alphabets for the entire set of Arabic alphabets;
   remove whitespace around the extracted individual alphabets;
   train a deep learning Convolution Neural Network classifier with four convolution layers based on the extracted individual alphabets to form a trained deep learning classifier;
   receive a new hand written cursively connected Arabic word by the target user;
   perform the trained deep learning classifier to classify the target user based on the received new hand written cursively connected Arabic word; and
   verify the target user from the classified target user, the verification of the target user including a verification accuracy of the hand written cursively connected Arabic words being larger than a verification accuracy threshold value;
   wherein the verification accuracy ($\beta$) of each hand written cursively connected Arabic word (w) for the target user (user$_j$) is computed as:

$$\beta = \frac{\sum_i F_{user_j}(a_i)}{|w|}$$

wherein w= $\{a_1, a_2, \ldots, a_m\}$,
   wherein for $\beta \geq 0.5$ the hand written cursively connected Arabic word (w) is verified to be written by the target user (user$_j$).

2. The device of claim 1, wherein the processing circuitry is further configured to perform the trained deep learning classifier to classify the target user based on a target user dataset of the extracted individual alphabets; and remove one or more of the extracted individual Arabic alphabets in the target user dataset associated with the target user when an average verification error across all target users is greater than a performing threshold to form a reduced alphabets dataset, and
   wherein the processing circuitry is further configured to verify the target user based on the reduced alphabets dataset.

3. The device of claim 1, wherein the training, by the processing circuitry, includes training one deep learning Convolution Neural Network classifier for each of a plurality of target users.

4. The device of claim 2, wherein each of the deep learning Convolution Neural Network classifiers includes a target class and a rest class.

5. The device of claim 2, wherein the target class represents a class being associated with the target user and the rest class represents a class being associated with users excluding the target user.

6. The device of claim 1, wherein the processing circuitry is further configured to verify the hand written cursively connected Arabic words by dividing a first number of alphabets verified to be written by the target user in the hand written Arabic words by a total number of alphabets in the hand written Arabic words.

* * * * *